United States Patent
Joo et al.

(10) Patent No.: US 12,443,301 B2
(45) Date of Patent: Oct. 14, 2025

(54) DISPLAY DEVICE WITH PIXEL TRANSISTOR AND SCAN DRIVING TRANSISTORS IN DISPLAY AREA IN CORNER PORTION

(71) Applicant: SAMSUNG DISPLAY CO., LTD., Yongin-si (KR)

(72) Inventors: Hye Jin Joo, Suwon-si (KR); Byeong Hee Won, Incheon (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/732,253

(22) Filed: Jun. 3, 2024

(65) Prior Publication Data

US 2024/0319812 A1   Sep. 26, 2024

Related U.S. Application Data

(60) Division of application No. 18/178,824, filed on Mar. 6, 2023, now Pat. No. 12,019,819, which is a
(Continued)

(30) Foreign Application Priority Data

Apr. 13, 2020 (KR) .......... 10-2020-0044630

(51) Int. Cl.
  *G06F 3/041* (2006.01)
  *G06F 3/044* (2006.01)

(52) U.S. Cl.
  CPC ........ *G06F 3/0412* (2013.01); *G06F 3/04164* (2019.05); *G06F 3/0445* (2019.05); *G06F 3/0446* (2019.05)

(58) Field of Classification Search
  CPC .. G06F 3/0412; G06F 3/04164; G06F 3/0445; G06F 3/0446; G09G 3/12; G09G 3/32; G09G 2300/0426
  See application file for complete search history.

(56) References Cited

U.S. PATENT DOCUMENTS 9,349,322 B2  5/2016  Kim et al.
9,940,860 B2  4/2018  Kang et al.
(Continued)

FOREIGN PATENT DOCUMENTS

CN  105304015 A  2/2016
CN  106847148 A  6/2017
(Continued)

OTHER PUBLICATIONS

Office Action issued in corresponding CN Application No. CN 202110354265.1 dated Jul. 22, 2024.

*Primary Examiner* — Liliana Cerullo
(74) *Attorney, Agent, or Firm* — F. CHAU & ASSOCIATES, LLC

(57) ABSTRACT

A display device includes a display panel including a front portion, a first side portion which extends from a first side of the front portion, a second side portion which extends from a second side of the front portion, and corner portion disposed between the first side portion and the second side portion. The display panel includes a first display area disposed in the front portion and including a plurality of first emission areas and a plurality of sensor electrodes, and a second display area disposed in the corner portion and including a plurality of second emission areas and a plurality of first sensor lines electrically connected to at least some of the sensor electrodes.

6 Claims, 26 Drawing Sheets

Related U.S. Application Data continuation of application No. 17/220,079, filed on Apr. 1, 2021, now Pat. No. 11,599,213.

(56) References Cited

U.S. PATENT DOCUMENTS

| | | |
|---|---|---|
| 10,409,401 B2 | 9/2019 | Huang et al. |
| 10,475,873 B2 | 11/2019 | Matsueda et al. |
| 10,990,133 B2 | 4/2021 | Nakatogawa |
| 11,599,213 B2 | 3/2023 | Joo et al. |
| 2016/0120005 A1 | 4/2016 | Wu et al. |
| 2017/0287381 A1* | 10/2017 | Park ............... G02F 1/13454 |
| 2018/0240850 A1 | 8/2018 | Chen et al. |
| 2018/0374401 A1 | 12/2018 | Yang et al. |
| 2019/0073968 A1 | 3/2019 | Tominaga |
| 2019/0096978 A1* | 3/2019 | Jung ............... G09G 3/3275 |
| 2019/0140207 A1 | 5/2019 | Li et al. |
| 2019/0243495 A1 | 8/2019 | Guo et al. |
| 2019/0258343 A1 | 8/2019 | Hwang et al. |
| 2019/0265824 A1 | 8/2019 | Abe et al. |
| 2020/0064682 A1 | 2/2020 | Ishikawa et al. |
| 2020/0064972 A1 | 2/2020 | Yen et al. |
| 2020/0142449 A1 | 5/2020 | Nakatogawa |
| 2020/0176696 A1 | 6/2020 | Dai |
| 2021/0183985 A1* | 6/2021 | Lim ............... H10K 59/873 |
| 2021/0200386 A1 | 7/2021 | Park |
| 2021/0200407 A1 | 7/2021 | Jang et al. |
| 2021/0318770 A1 | 10/2021 | Joo et al. |
| 2022/0005877 A1 | 1/2022 | Seo et al. |
| 2022/0129131 A1 | 4/2022 | Liu et al. |
| 2023/0205347 A1 | 6/2023 | Joo et al. |

FOREIGN PATENT DOCUMENTS

| | | |
|---|---|---|
| CN | 106876609 A | 6/2017 |
| CN | 107689210 A | 2/2018 |
| CN | 108682303 A | 10/2018 |
| CN | 109064907 A | 12/2018 |
| CN | 110870001 A | 3/2020 |
| JP | 2019015937 A | 1/2019 |
| KR | 10-2018-0018960 | 2/2018 |
| KR | 10-1862529 | 5/2018 |
| KR | 10-2021-0017145 | 2/2021 |

* cited by examiner

DISPLAY DEVICE WITH PIXEL TRANSISTOR AND SCAN DRIVING TRANSISTORS IN DISPLAY AREA IN CORNER PORTION

CROSS-REFERENCE TO RELATED APPLICATIONS

This application is a divisional of U.S. patent application Ser. No. 18/178,824 filed Mar. 6, 2023, which is a continuation of U.S. patent application Ser. No. 17/220,079 filed Apr. 1, 2021, which issued as U.S. Pat. No. 11,599,213 on Mar. 7, 2023, which claims priority under 35 U.S.C. § 119 to Korean Patent Application No. 10-2020-0044630 filed on Apr. 13, 2020, the disclosures of which are incorporated by reference herein in their entirety.

TECHNICAL FIELD

Exemplary embodiments of the present inventive concept relate to a display device.

DISCUSSION OF THE RELATED ART

Display devices may be implemented in various electronic devices such as, for example, smartphones, digital cameras, notebook computers, navigation systems, smart televisions (TVs), etc.

As technology advances, the demand for display devices with various design features has increased in accordance with applications of display devices to a variety of electronic devices. For example, research has been conducted on a display device capable of displaying an image not only on a front surface thereof, but also on four curved edge parts thereof. This type of display device may include a corner portion between a first side portion bent from a first edge at the front thereof and a second side portion bent from a second edge at the front thereof.

SUMMARY

Exemplary embodiments of the present inventive concept provide a display device capable of preventing a non-display area disposed between a display area at the front thereof and a display area in a corner portion thereof from becoming visible to a user.

According to an exemplary embodiment of the present inventive concept, a display device includes a display panel including a front portion, a first side portion which extends from a first side of the front portion, a second side portion which extends from a second side of the front portion, and corner portion disposed between the first side portion and the second side portion. The display panel includes a first display area disposed in the front portion and including a plurality of first emission areas and a plurality of sensor electrodes, and a second display area disposed in the corner portion and including a plurality of second emission areas and a plurality of first sensor lines electrically connected to at least some of the sensor electrodes.

In an exemplary embodiment, the first sensor lines do not overlap the second emission areas.

In an exemplary embodiment, at least one of the first sensor lines is disposed between each pair of adjacent second emission areas.

In an exemplary embodiment, multiple first sensor lines from among the plurality of first sensor lines are disposed between each pair of adjacent second emission areas.

In an exemplary embodiment, each of the second emission areas includes one or more sub-emission areas that emit light of different colors, and at least one of the first sensor lines is disposed between the sub-emission areas.

In an exemplary embodiment, the display panel further includes a third display area disposed in the corner portion, the third display area includes a plurality of cutout portions spaced apart from one another, and a plurality of third emission areas disposed in the cutout portions, and the second display area is disposed between the first display area and the third display area.

In an exemplary embodiment, the display device further includes a plurality of cutout gaps formed between the plurality of cutout portions.

In an exemplary embodiment, the second emission areas are disposed between at least one of the first sensor lines and the third emission areas.

In an exemplary embodiment, the cutout portions include dams which surround the third emission areas.

In an exemplary embodiment, the display panel further includes a non-display area disposed in the corner portion, and the third display area is disposed between the second display area and the non-display area.

In an exemplary embodiment, a first end of each of the cutout portions is connected to the second display area, and a second end of each of the cutout portions is connected to the non-display area.

In an exemplary embodiment, the display device further includes a plurality of second sensor lines disposed in the non-display area and electrically connected to at least some of the sensor electrodes.

In an exemplary embodiment, the second sensor lines are disposed in a winding shape including multiple bent portions.

In an exemplary embodiment, the display panel further includes a third display area disposed in the corner portion and including a plurality of second sensor lines connected to at least some of the sensor electrodes, and the second display area is disposed between the first and third display areas.

In an exemplary embodiment, the third display area includes a plurality of island portions spaced apart from one another, a plurality of connecting portions which connect the island portions to one another, and a plurality of third emission areas disposed in the island portions.

In an exemplary embodiment, the second sensor lines are disposed in the island portions and the connecting portions, and do not overlap the third emission areas.

In an exemplary embodiment, the third display area further includes a plurality of cutout portions disposed between the island portions.

According to an exemplary embodiment of the present inventive concept, a display device includes a first display area including a plurality of first emission areas and a plurality of sensor electrodes, a second display area disposed adjacent to the first display area and including a plurality of second emission areas and a plurality of first sensor lines electrically connected to at least some of the sensor electrodes, and a non-display area disposed adjacent to the first and second display areas and including the first sensor lines.

In an exemplary embodiment, the first sensor lines do not overlap the second emission areas.

In an exemplary embodiment, the display device further includes a third display area disposed adjacent to the second display area. The third display area includes a plurality of cutout portions spaced apart from one another, and a plurality of third emission areas disposed in the cutout portions. The second display area is disposed between the first and third display areas.

BRIEF DESCRIPTION OF THE DRAWINGS

The above and other features of the present inventive concept will become more apparent by describing in detail exemplary embodiments thereof with reference to the accompanying drawings, in which.

DETAILED DESCRIPTION

Figure 1:
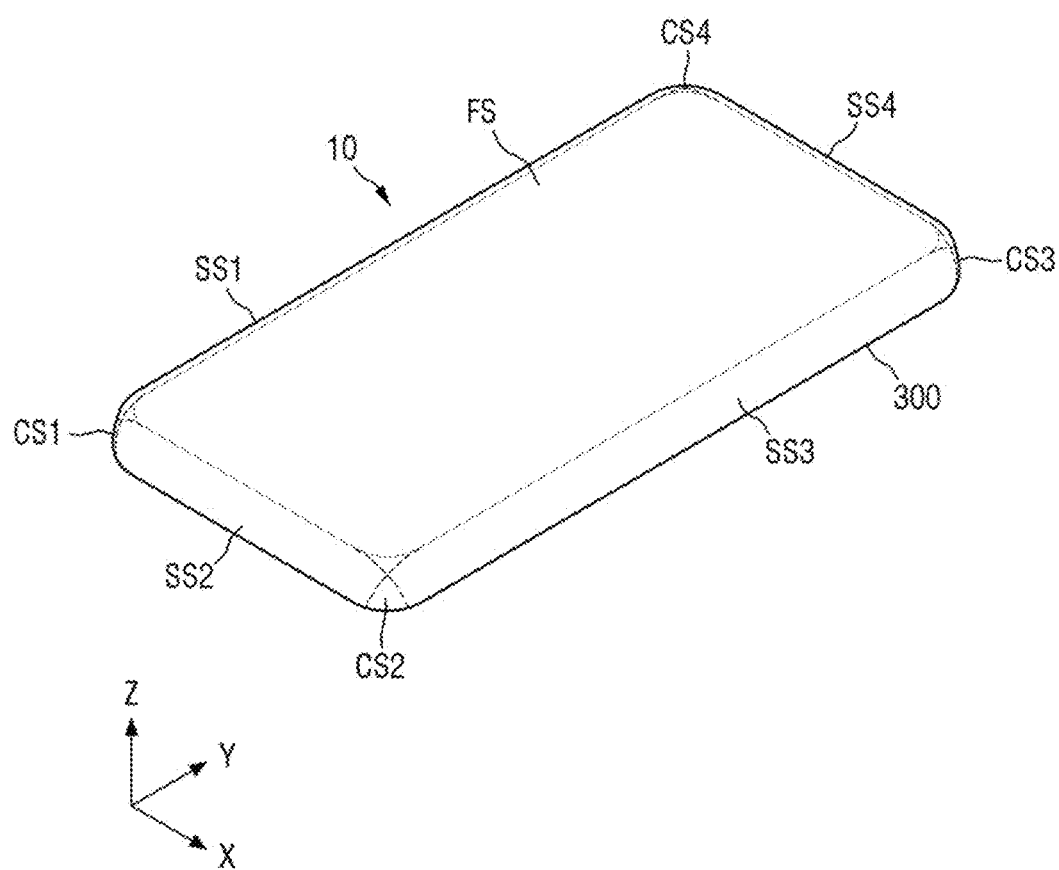
FIG. 1 is a perspective view of a display device according to an exemplary embodiment of the present inventive concept.

Exemplary embodiments of the present inventive concept will be described more fully hereinafter with reference to the accompanying drawings. Like reference numerals may refer to like elements throughout the accompanying drawings.

It will be understood that when a component, such as a film, a region, a layer, or an element, is referred to as being "on", "connected to", "coupled to", or "adjacent to" another component, it can be directly on, connected, coupled, or adjacent to the other component, or intervening components may be present. It will also be understood that when a component is referred to as being "between" two components, it can be the only component between the two components, or one or more intervening components may also be present. It will also be understood that when a component is referred to as "covering" another component, it can be the only component covering the other component, or one or more intervening components may also be covering the other component. Other words use to describe the relationship between elements may be interpreted in a like fashion.

It will be further understood that descriptions of features or aspects within each exemplary embodiment are available for other similar features or aspects in other exemplary embodiments, unless the context clearly indicates otherwise.

As used herein, the singular forms "a", "an" and "the" are intended to include the plural forms as well, unless the context clearly indicates otherwise.

Spatially relative terms, such as "beneath", "below", "lower", "under", "above", "upper", etc., may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below.

It will be understood that the terms "first," "second," "third," etc. are used herein to distinguish one element from another, and the elements are not limited by these terms.

Thus, a "first" element in an exemplary embodiment may be described as a "second" element in another exemplary embodiment.

Herein, when one value is described as being about the same as or about equal to another value, it is to be understood that the values are equal to each other to within a measurement error, or if measurably unequal, are close enough in value to be functionally equal to each other as would be understood by a person having ordinary skill in the art. It will be further understood that when two components or directions are described as extending substantially parallel or perpendicular to each other, the two components or directions extend exactly parallel or perpendicular to each other, or extend approximately parallel or perpendicular to each other as would be understood by a person having ordinary skill in the art (e.g., within a measurement error). Other uses of the terms "substantially" and "about" should be interpreted in a like fashion.

Figure 2:
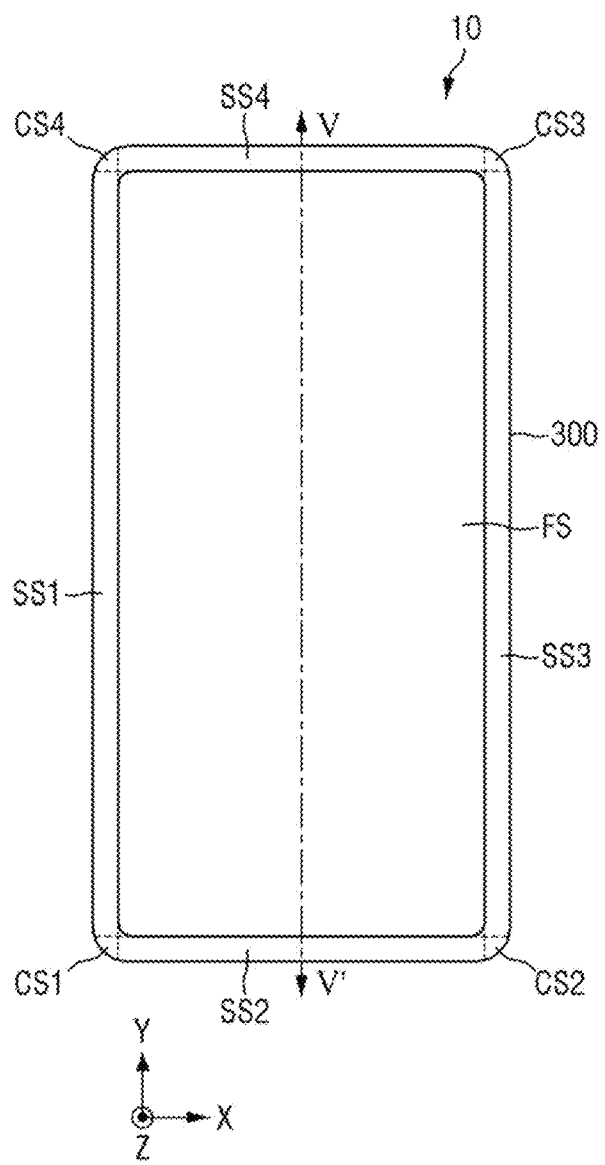
FIG. 2 is a plan view of the display device of FIG. 1.

FIG. 1 is a perspective view of a display device according to an exemplary embodiment of the present inventive concept. FIG. 2 is a plan view of the display device of FIG. 1.

Referring to FIGS. 1 and 2, a display device 10 may be utilized in a portable electronic device such as, for example, a mobile phone, a smartphone, a tablet personal computer (PC), a mobile communication terminal, an electronic notepad, an electronic book (e-book) reader, a portable multimedia player (PMP), a navigation device, or an ultra-mobile PC (UMPC). The display device 10 may also be utilized in, for example, a television (TV), a notebook computer, a monitor, a billboard, or a display unit of an Internet-of-Things (IoT) device. The display device 10 may also be utilized in a wearable device such as, for example, a smartwatch, a watchphone, an eyeglasses-based display, or a head-mounted display (HMD). The display device 10 may also be utilized in, for example, the dashboard, the center fascia, or the center information display (CID) of a vehicle, the room mirror display of a vehicle that can replace side-view mirrors, or an entertainment display disposed at the rear of the front seat of a vehicle.

A first direction (or an X-axis direction) may be a direction substantially parallel to the short sides of the display device 10 in a plan view, for example, a horizontal direction of the display device 10. A second direction (or a Y-axis direction) may be a direction substantially parallel to the long sides of the display device 10 in a plan view, for example, a vertical direction of the display device 10. A third direction (or a Z-axis direction) may be a thickness direction of the display device 10 that crosses the first direction and the second direction.

The display device 10 may include a display panel 300. As illustrated in FIGS. 1 and 2, the display panel 300 may include a front portion FS, a first side portion SS1, a second side portion SS2, a third side portion SS3, a fourth side portion SS4, a first corner portion CS1 connecting the first side portion SS1 and the second side portion SS2, a second corner portion CS2 connecting the second side portion SS2 and the third side portion SS3, a third corner portion CS3 connecting the third side portion SS3 and the fourth side portion SS4, and a fourth corner portion CS4 connecting the first side portion SS1 and the fourth side portion SS4.

The display panel 300 may include a flexible substrate SUB (see FIG. 4) that is bendable, foldable, or rollable. For example, the substrate SUB may include polyethersulphone (PES), polyacrylate (PA), polyarylate (PAR), polyetherimide (PEI), polyethylene naphthalate (PEN), polyethylene terephthalate (PET), polyphenylene sulfide (PPS), polyallylate, polyimide (PI), polycarbonate (PC), cellulose triacetate (TAC), cellulose acetate propionate (CAP), or a combination thereof. Alternatively, the substrate SUB may include a metallic material. The substrate SUB may be partially or fully flexible.

The front portion FS may have a rectangular shape having short sides extending in the first direction (or the X-axis direction) and long sides extending in the second direction (or the Y-axis direction) in a plan view. In this case, the short sides of the front portion FS may be relatively shorter than the long sides of the front portion FS. However, the present inventive concept is not limited thereto. For example, according to exemplary embodiments, the front portion FS may have various other shapes such as another polygonal shape, a circular shape, or an elliptical shape in a plan view. FIGS. 1 and 2 illustrate that the front portion FS is flat. However, the present inventive concept is not limited thereto. For example, according to exemplary embodiments, the front portion FS may be curved.

The first side portion SS1 may extend from a first side of the front portion FS. The first side portion SS1 may be bent along a first bending line (BL1 of FIG. 3) on the first side of the front portion FS and may have a first curvature. The first side of the front portion FS may be the left side of the front portion FS, as illustrated in FIGS. 1 and 2.

The second side portion SS2 may extend from a second side of the front portion FS. The second side portion SS2 may be bent along a second bending line (BL2 of FIG. 3) on the second side of the front portion FS and may have a second curvature. The second curvature may be different from the first curvature, but the present inventive concept is not limited thereto. The second side of the front portion FS may be the lower side of the front portion FS, as illustrated in FIGS. 1 and 2.

The third side portion SS3 may extend from a third side of the front portion FS. The third side portion SS3 may be bent along a third bending line (BL3 of FIG. 3) on the third side of the front portion FS and may have a third curvature. The third curvature may be the same as the first curvature, but the present inventive concept is not limited thereto. The third side of the front portion FS may be the right side of the front portion FS, as illustrated in FIGS. 1 and 2.

The fourth side portion SS4 may extend from a fourth side of the front portion FS. The fourth side portion SS4 may be bent along a fourth bending line (BL4 of FIG. 3) on the fourth side of the front portion FS and may have a fourth curvature. The fourth curvature may be the same as the second curvature, but the present inventive concept is not limited thereto. The fourth side of the front portion FS may be the upper side of the front portion FS, as illustrated in FIGS. 1 and 2.

The first corner portion CS1 may be disposed between the first and second side portions SS1 and SS2. For example, the first corner portion CS1 may adjoin the lower side of the first side portion SS1 and the left side of the second side portion SS2. The first corner portion CS1 may be a double-curvature region curved by the first and second curvatures of the first and second side portions SS1 and SS2. Accordingly, strain may be applied to the first corner portion CS1 by bending forces from the first and second curvatures of the first and second side portions SS1 and SS2.

The second corner portion CS2 may be disposed between the second and third side portions SS2 and SS3. For example, the second corner portion CS2 may adjoin the right side of the second side portion SS2 and the lower side of the third side portion SS3. The second corner portion CS2 may be a double-curvature region curved by the second and third curvatures of the second and third side portions SS2 and SS3. Accordingly, strain may be applied to the second corner portion CS2 by bending forces from the second and third curvatures of the second and third side portions SS2 and SS3.

The third corner portion CS3 may be disposed between the third and fourth side portions SS3 and SS4. For example, the third corner portion CS3 may adjoin the upper side of the third side portion SS3 and the right side of the fourth side portion SS4. The third corner portion CS3 may be a double-curvature region curved by the third and fourth curvatures of the third and fourth side portions SS3 and SS4. Accordingly, strain may be applied to the third corner portion CS3 by bending forces from the third and fourth curvatures of the third and fourth side portions SS3 and SS4.

The fourth corner portion CS4 may be disposed between the first and fourth side portions SS1 and SS4. For example, the fourth corner portion CS4 may adjoin the upper side of the first side portion SS1 and the left side of the fourth side portion SS4. The fourth corner portion CS4 may be a double-curvature region curved by the first and fourth curvatures of the first and fourth side portions SS1 and SS4. Accordingly, strain may be applied to the fourth corner portion CS4 by bending forces from the first and fourth curvatures of the first and fourth side portions SS1 and SS4.

Figure 6A:
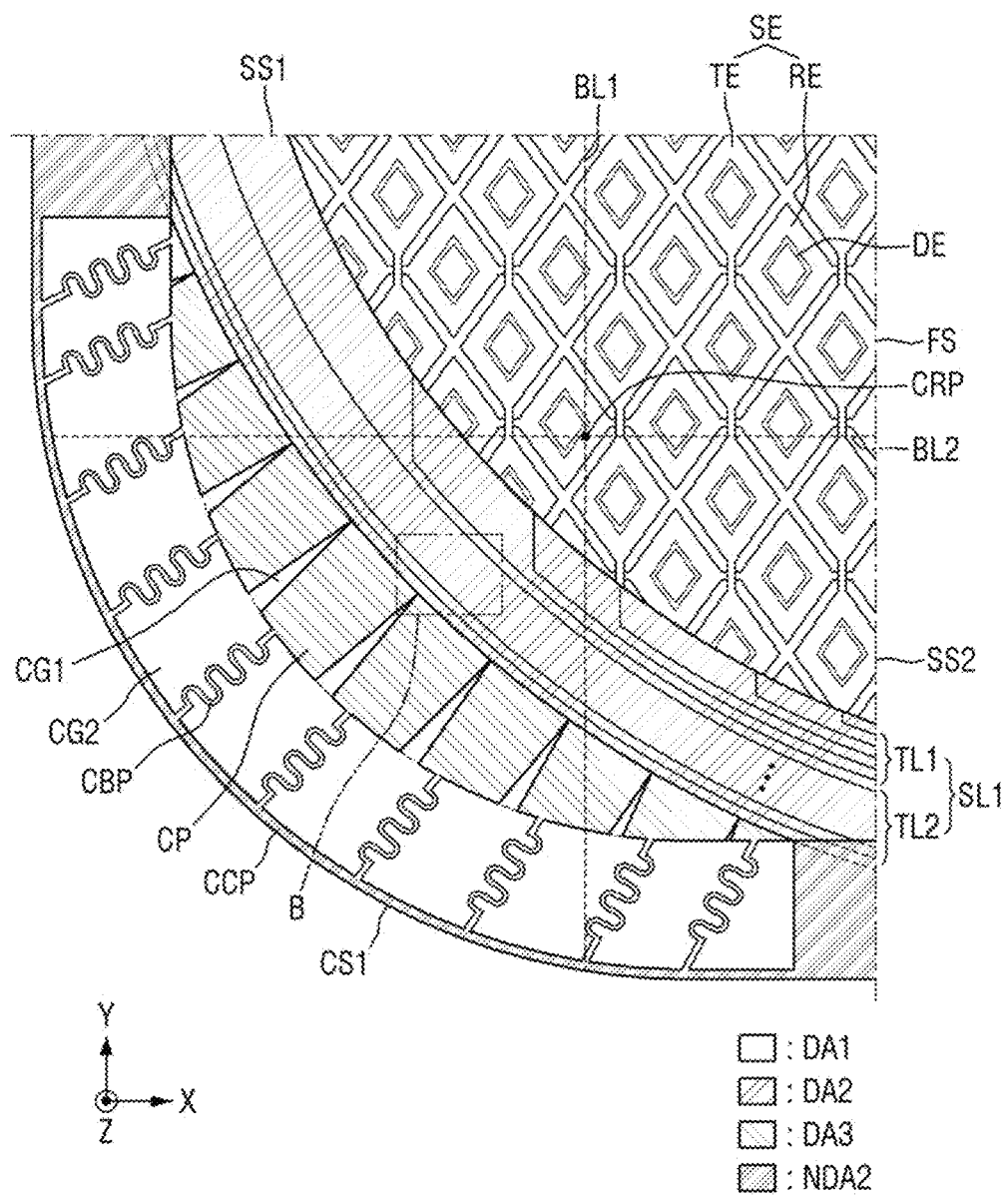
FIG. 6A is a layout view illustrating first, second, and third display areas and a second non-display area of a display panel according to an exemplary embodiment of the present inventive concept.
Figure 24:
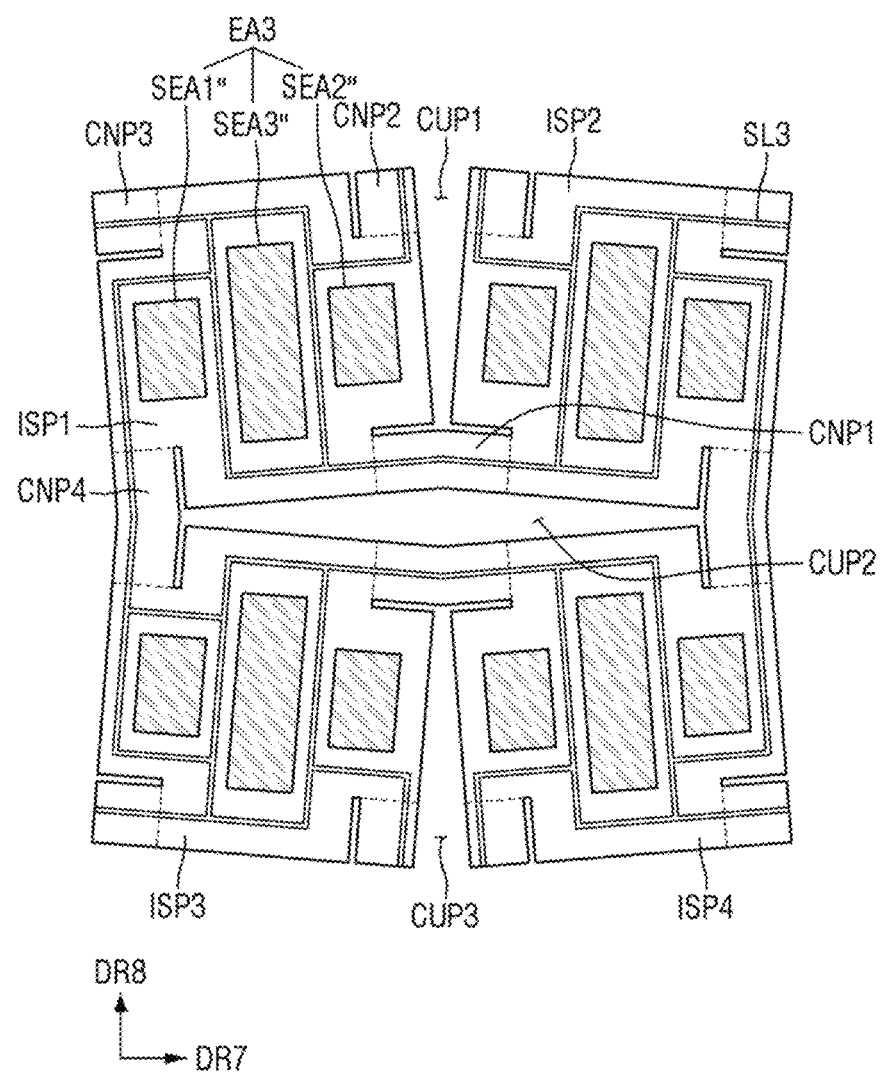

Each of the first, second, third, and fourth corner portions CS1, CS2, CS3, and CS4 may include cutout portions, which are defined by incisions, as illustrated in FIG. 6A, or may include island portions, which are defined by incisions, as illustrated in FIG. 24.

Figure 3:
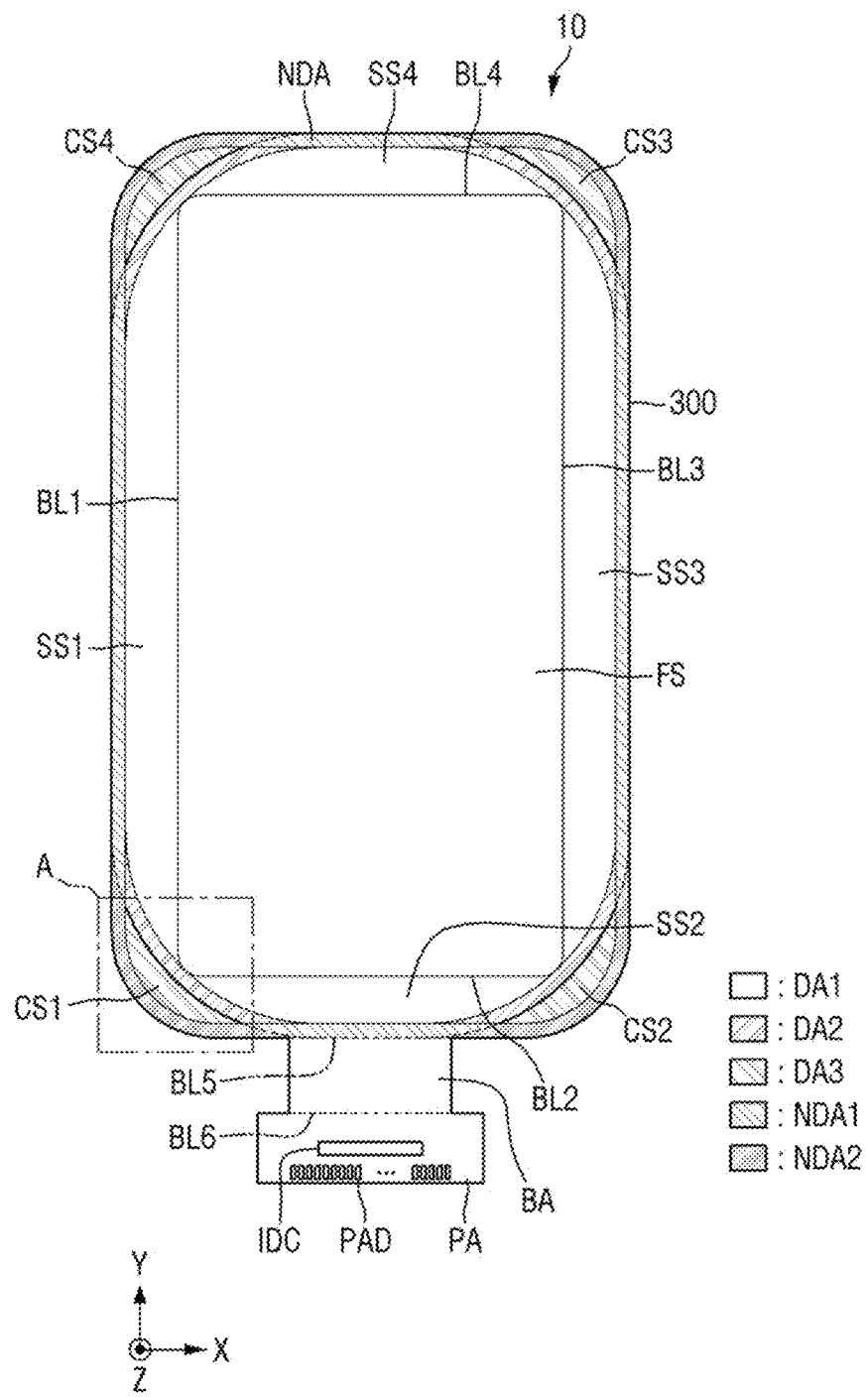
FIG. 3 is a development view of the display device of FIG. 1.

FIG. 3 is a development view of the display device of FIG. 1.

Referring to FIG. 3, the display panel 300 may further include a bending part BA and a pad part PA. For example, the display panel 300 may include first, second, and third display areas DA1, DA2, and DA3, first and second non-display areas NDA1 and NDA2, the bending part BA, and the pad part PA.

The first, second, and third display areas DA1, DA2, and DA3 refer to regions that include pixels or emission areas, and thus, display an image. The first and second non-display areas NDA1 and NDA2 refer to regions that do not include pixels or emission areas, and thus, do not display an image. Signal lines or panel-embedded driving circuits for driving pixels or emission areas may be disposed in the first and second non-display areas NDA1 and NDA2. The first non-display area NDA1 and the second non-display area NDA2 may be collectively referred to as a non-display area NDA.

The first display area DA1, which is a main display area of the display panel 300, may include the front portion FS, part of the first side portion SS1, part of the second side portion SS2, part of the third side portion SS3, and part of the fourth side portion SS4. Here, the part of the first side portion SS1 refers to part of the first side portion SS1 that extends from the first side of the front portion FS, the part of the second side portion SS2 refers to part of the second side portion SS2 that extends from the second side of the front portion FS, the part of the third side portion SS3 refers to part of the third side portion SS3 that extends from the third side of the front portion FS, and the part of the fourth side portion SS4 refers to part of the fourth side portion SS4 that extends from the fourth side of the front portion FS. The corners of the first display area DA1 may be formed to be rounded to have a predetermined curvature.

The second display area DA2 may be an auxiliary display area that assists the main display area. The resolution of the second display area DA2 may be different from the resolution of the first display area DA1. For example, the resolution of the second display area DA2 may be lower than the resolution of the first display area DA1. That is, the number of second emission areas per unit area of the second display area DA may be smaller than the number of first emission areas per unit area of the first display area DA1. However, the present inventive concept is not limited thereto. For example, according to exemplary embodiments, the resolution of the second display area DA2 may be substantially the same as the resolution of the first display area DA1.

The second display area DA2 may be disposed on the outside of one of the corners of the first display area DA1. At least part of the second display area DA2 may be disposed in at least one of the first, second, third, and fourth corner portions CS1, CS2, CS3, and CS4. Also, at least part of the second display area DA2 may be disposed in the front portion FS. Also, at least part of the second display area DA2 may be disposed in at least two of the first, second, third, and fourth side portions SS1, SS2, SS3, and SS4.

For example, at least part of the second display area DA2 on the outside of the lower left corner of the first display area DA1 may be disposed in the front portion FS, the first corner portion CS1, the first side portion SS1, and the second side portion SS2, at least part of the second display area DA2 on the outside of the lower right corner of the first display area DA1 may be disposed in the front portion FS, the second corner portion CS2, the second side portion SS2, and the third side portion SS3, at least part of the second display area DA2 on the outside of the upper right corner of the first display area DA1 may be disposed in the front portion FS, the third corner portion CS3, the third side portion SS3, and the fourth side portion SS4, and at least part of the second display area DA2 on the outside of the upper left corner of the first display area DA1 may be disposed in the front portion FS, the fourth corner portion CS4, the first side portion SS1, and the fourth side portion SS4.

The third display area DA3 may be an auxiliary display area that assists the main display area. The resolution of the third display area DA3 may be different from the resolution of the first display area DA1. For example, the resolution of the third display area DA3 may be lower than the resolution of the first display area DA1. That is, the number of third emission areas per unit area of the third display area DA3 may be smaller than the number of first emission areas per unit area of the first display area DA1. However, the present inventive concept is not limited thereto. For example, according to exemplary embodiments, the resolution of the third display area DA3 may be substantially the same as the resolution of the first display area DA1.

In an exemplary embodiment, the resolution of each of the first display area DA1, the second display area DA2, and the third display area DA3 are different from one another. For example, in an exemplary embodiment, the resolution of the second display area DA2 is lower than the resolution of the first display area DA1, and the resolution of the third display area DA3 is lower than the resolution of the second display area DA2.

The third display area DA3 may be disposed on the outside of the second display area DA2. Accordingly, the second display area DA2 may be disposed between the first display area DA1 and the third display area DA3. At least part of the third display area DA3 may be disposed in at least one of the first, second, third, and fourth corner portions CS1, CS2, CS3, and CS4. Also, at least part of the third display area DA3 may be disposed in at least two of the first, second, third, and fourth side portions SS1, SS2, SS3, and SS4.

For example, at least part of the third display area DA3 on the outside of the lower left corner of the first display area DA1 may be disposed in the first corner portion CS1, the first side portion SS1, and the second side portion SS2, at least part of the third display area DA3 on the outside of the lower right corner of the first display area DA1 may be disposed in the second corner portion CS2, the second side portion SS2, and the third side portion SS3, at least part of the third display area DA3 on the outside of the upper right corner of the first display area DA1 may be disposed in the third corner portion CS3, the third side portion SS3, and the fourth side portion SS4, and at least part of the third display area DA3 on the outside of the upper left corner of the first display area DA1 may be disposed in the fourth corner portion CS4, the first side portion SS1, and the fourth side portion SS4.

The first non-display area NDA1 may include part of the first side portion SS1, part of the second side portion SS2, part of the third side portion SS3, and part of the fourth side portion SS4. Here, the part of the first side portion SS1 refers to a left edge part of the first side portion SS1, the part of the second side portion SS2 refers to a lower edge part of the second side portion SS2, the part of the third side portion SS3 refers to a right edge part of the third side portion SS3, and the part of the fourth side portion SS4 refers to an upper edge part of the fourth side portion SS4.

The second non-display area NDA2 may be disposed on the outside of the third display area DA3. At least part of the second non-display area NDA2 may be disposed in at least one of the first, second, third, and fourth corner portions CS1, CS2, CS3, and CS4. Also, at least part of the second non-display area NDA2 may be disposed in at least two of the first, second, third, and fourth side portions SS1, SS2, SS3, and SS4.

For example, at least part of the second non-display area NDA2 on the outside of the lower left corner of the first display area DA1 may be disposed in the first corner portion CS1, the first side portion SS1, and the second side portion SS2, at least part of the second non-display area NDA2 on the outside of the lower right corner of the first display area DA1 may be disposed in the second corner portion CS2, the second side portion SS2, and the third side portion SS3, at least part of the second non-display area NDA2 on the outside of the upper right corner of the first display area DA1 may be disposed in the third corner portion CS3, the third side portion SS3, and the fourth side portion SS4, and at least part of the second non-display area NDA2 on the outside of the upper left corner of the first display area DA1 may be disposed in the fourth corner portion CS4, the first side portion SS1, and the fourth side portion SS4.

The bending part BA may extend from the lower side of the second side portion SS2. The bending part BA may be disposed between the second side portion SS2 and the pad part PA. The length of the bending part BA in the first direction (or the X-axis direction) may be smaller than the length of the second side portion SS2 in the first direction (or the X-axis direction). The bending part BA may be bent along a fifth bending line BL5 below the second side portion SS2.

The pad part PA may extend from the lower side of the bending part BA. The length of the pad part PA in the first direction (or the X-axis direction) may be greater than the length of the bending part BA in the first direction (or the X-axis direction). However, the present inventive concept is not limited thereto. For example, according to exemplary embodiments, the length of the pad part PA in the first direction (or the X-axis direction) may be substantially the same as the length of the bending part BA in the first direction (or the X-axis direction). The pad part PA may be bent along a sixth bending line BL6 below the bending part BA. The pad part PA may be disposed on the bottom surface of the front portion FS.

An integrated driving circuit IDC and pads PAD may be disposed on the pad part PA. The integrated driving circuit IDC may be formed as an integrated circuit (IC). The integrated driving circuit IDC may be attached on the pad part PA, for example, in a chip-on-glass (COG) manner, a chip-on-plastic (COP) manner, or an ultrasonic bonding manner. Alternatively, the integrated driving circuit IDC may be disposed on a circuit board provided on the pads PAD.

The integrated driving circuit IDC may be electrically connected to the pads PAD of the pad part PA. The integrated driving circuit IDC may receive digital video data and timing signals via the pads PAD of the pad part PA. The integrated driving circuit IDC may convert the digital video data into analog data voltages and may output the analog data voltages to data lines of the first, second, and third display areas DA1, DA2, and DA3.

A circuit board may be attached on the pads PAD of the pad part PA via, for example, an anisotropic conductive film. As a result, the pads PAD of the pad part PA may be electrically connected to the circuit board.

As illustrated in FIG. 3, the first, second, and third display areas DA1, DA2, and DA3 may be disposed in the front portion FS, the first, second, third, and fourth side portions SS1, SS2, SS3, and SS4, and the first, second, third, and fourth corner portions CS1, CS2, CS3, and CS4 of the display panel 300. Accordingly, an image may be displayed not only in the front portion FS and the first, second, third, and fourth side portions SS1, SS2, SS3, and SS4, but also in the first, second, third, and fourth corner portions CS1, CS2, CS3, and CS4 of the display panel 300.

Figure 4:
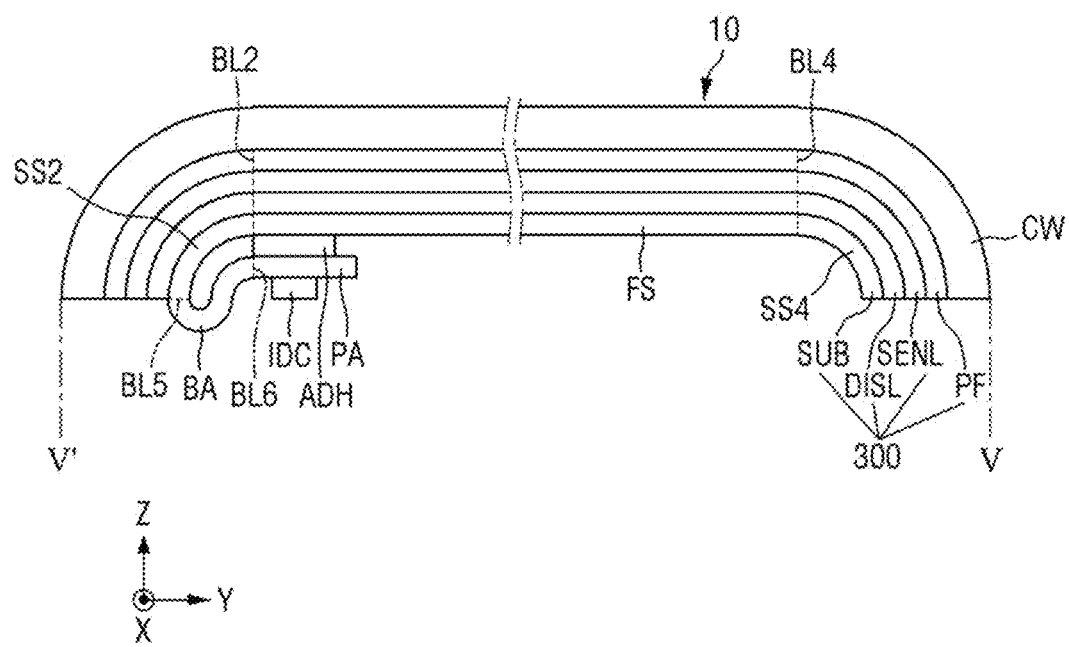
FIG. 4 is a cross-sectional view of the display device of FIG. 1.

FIG. 4 is a cross-sectional view of the display device of FIG. 1. For example, FIG. 4 is a cross-sectional view taken along line V-V' of FIG. 2.

Referring to FIG. 4, the display panel 300 may include a substrate SUB, a display layer DISL, a sensor electrode layer SENL, a polarizing film PF, and/or a cover window CW.

The display layer DISL may be disposed on the substrate SUB. The display layer DISL may include the first, second, and third display areas DA1, DA2, and DA3 and the first and second non-display areas NDA1 and NDA2. In the first, second, and third display areas DA1, DA2, and DA3 of the display layer DISL, not only emission areas, but also scan lines, data lines, and power lines for driving light-emitting elements may be disposed. In the first and second non-display areas NDA1 and NDA2 of the display layer DISL, a scan driving circuit, which outputs scan signals to the scan lines, and fan-out lines, which connect the data lines and the integrated driving circuit IDC, may be disposed.

The display layer DISL may include a thin-film transistor (TFT) layer (TFTL of FIG. 8) in which TFTs are formed, a light-emitting element layer (EML of FIG. 8) in which light-emitting elements that emit light are disposed, and an encapsulation layer (TFEL of FIG. 8) which is encapsulates the light-emitting element layer.

The sensor electrode layer SENL may be disposed on the display layer DISL. The sensor electrode layer SENL may include a plurality of sensor electrodes. The sensor electrode layer SENL may detect touch input from a person or an object using the sensor electrodes.

The polarizing film PF may be disposed on the sensor electrode layer SENL. The polarizing film PF may include a first base member, a linear polarizing plate, one or more phase retarder films such as a quarter-wave (λ/4) plate and/or a half-wave (λ/2) plate, and a second base member. For example, the first base member, the linear polarizing plate, a λ/4 plate, a λ/2 plate, and the second base member may be sequentially stacked on the sensor electrode layer SENL.

The cover window CW may be disposed on the polarizing film PF. The cover window CW may be attached on the polarizing film PF via a transparent adhesive member such as, for example, an optically clear adhesive (OCA) or an optically clear resin (OCR). The cover window CW may include an inorganic material such as, for example, glass, or an organic material such as, for example, plastic or a polymer material.

The bending part BA may be bent along the fifth bending line BL5 to be disposed on the bottom surface of the second side portion SS2. The pad part PA may be bent along the sixth bending line BL6 to be disposed on the bottom surface of the front portion FS. The pad part PA may be attached on the bottom surface of the front portion FS via an adhesive member ADH. The adhesive member ADH may be, for example, a pressure sensitive adhesive (PSA).

Figure 5:
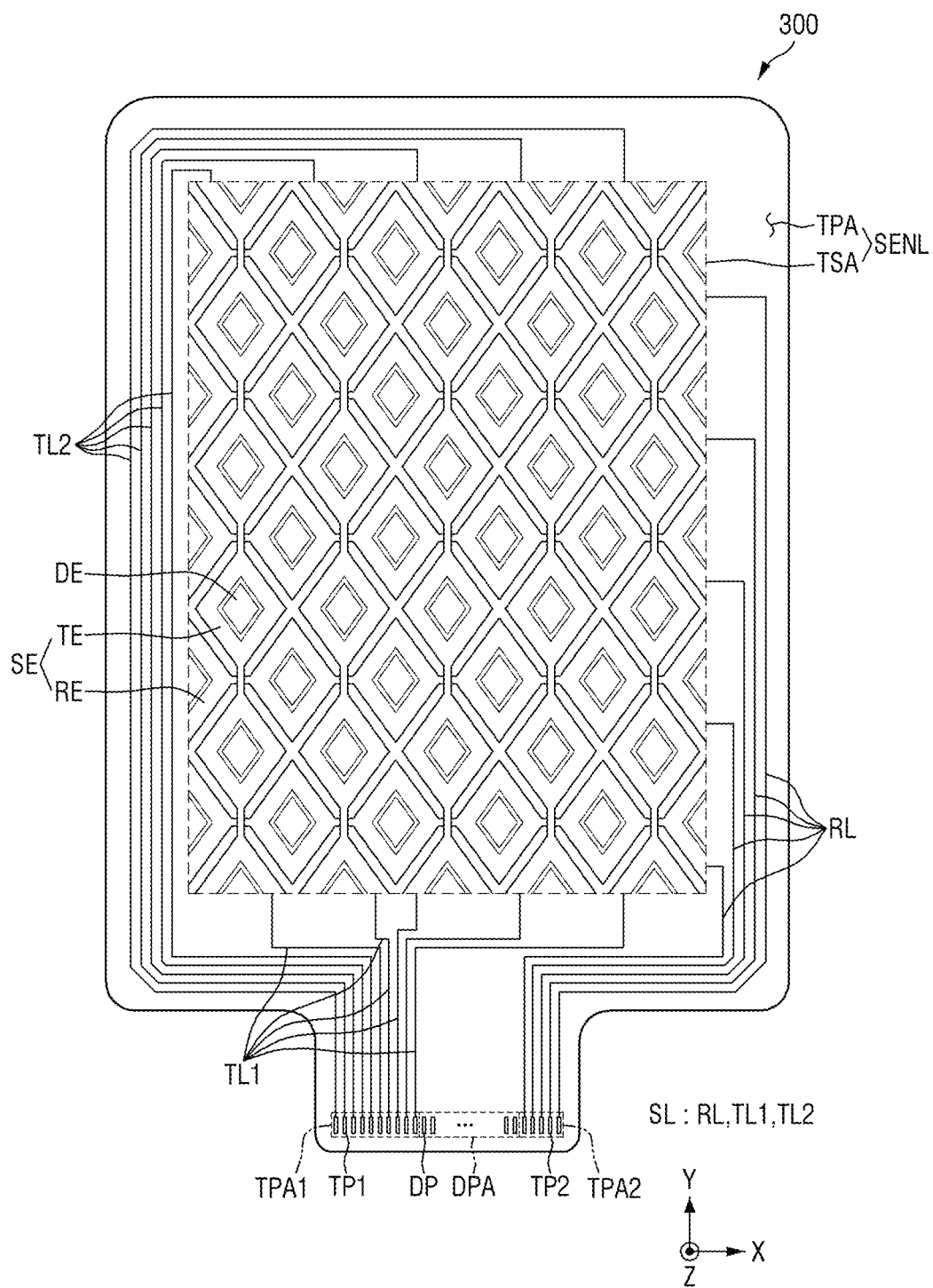
FIG. 5 is a layout view illustrating an exemplary sensor electrode layer of the display panel of FIG. 4.

FIG. 5 is a layout view illustrating an exemplary sensor electrode layer of the display panel of FIG. 4.

According to exemplary embodiments, sensor electrodes SE of the sensor electrode layer SENL may include two types of electrodes, for example, driving electrodes TE and sensing electrodes RE, and may be driven in a mutual-capacitance manner by applying driving signals to the driving electrodes TE and detecting voltages that the mutual capacitances of the sensing electrodes RE are charged with. However, the present inventive concept is not limited thereto.

For convenience of illustration, FIG. 5 illustrates only sensor electrodes (TE and RE), dummy patterns DE, sensor lines SL (TL1, TL2, and RL), and sensor pads (TP1 and TP2).

Referring to FIG. 5, the sensor electrode layer SENL includes a touch sensor area TSA in which touch input from a user is detected, and a touch peripheral area TPA which is disposed on the periphery of the touch sensor area TSA. The touch sensor area TSA may overlap the first, second, and third display areas DA1, DA2, and DA3 of FIG. 3, and the touch peripheral area TPA may overlap the first and second non-display areas NDA1 and NDA2 of FIG. 3.

The touch sensor area TSA may include the sensor electrodes SE and dummy patterns DE. The sensor electrodes SE may be electrodes for forming mutual capacitances to detect a touch input from the user or an object.

The sensor electrodes SE may include driving electrodes TE and sensing electrodes RE. The sensing electrodes RE may be arranged substantially in parallel to one another in the first direction (or the X-axis direction) and in the second direction (or the Y-axis direction). The sensing electrodes RE may be electrically connected in the first direction (or the X-axis direction). Each pair of adjacent sensing electrodes RE in the first direction (or the X-axis direction) may be connected. Each pair of adjacent sensing electrodes RE in the second direction (or the Y-axis direction) may be electrically isolated.

Figure 7:
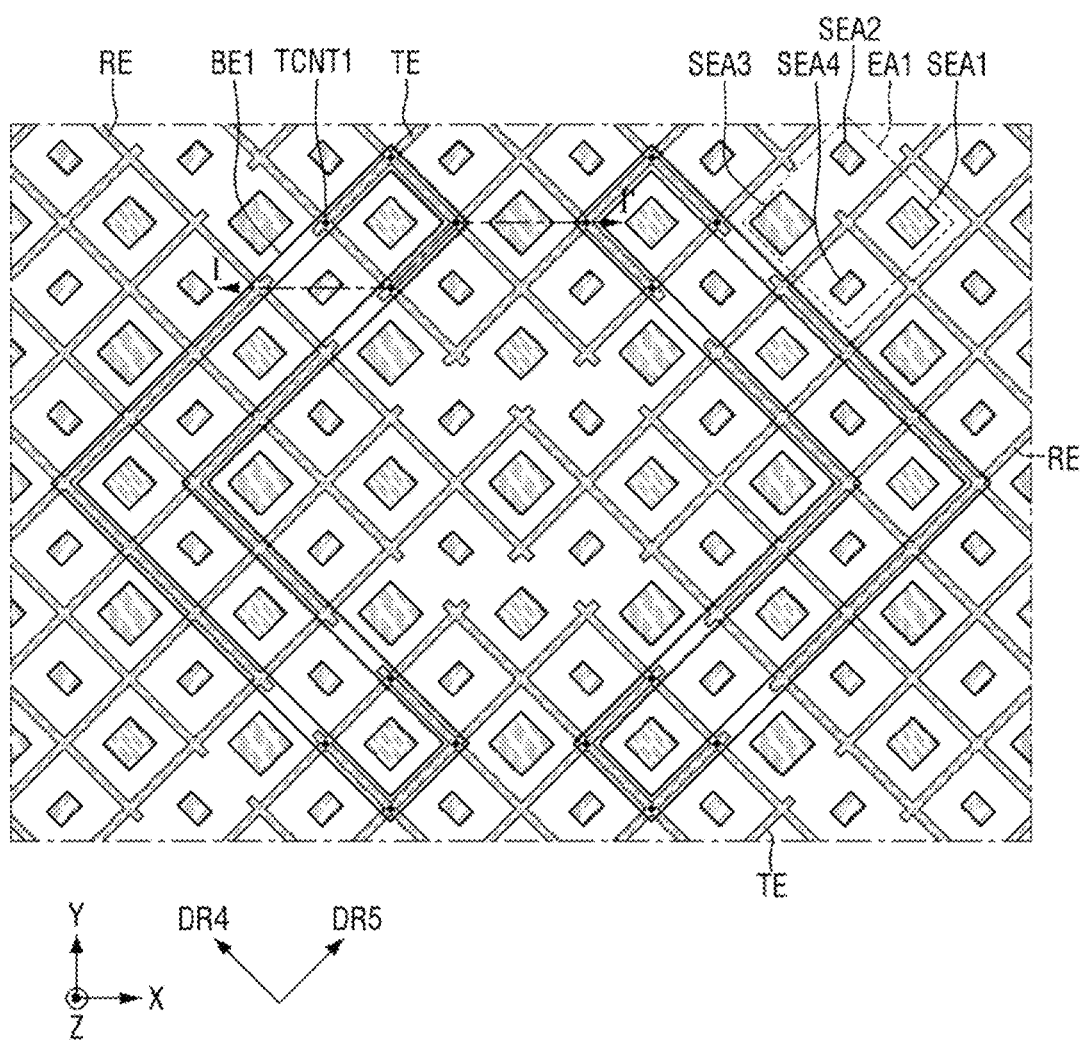
FIG. 7 is a layout view illustrating sensor electrodes and first emission areas in the first display area of FIG. 6A.

The driving electrodes TE may be arranged substantially in parallel to one another in the first direction (or the X-axis direction) and in the second direction (or the Y-axis direction). Each pair of adjacent driving electrodes TE in the first direction (or the X-axis direction) may be electrically isolated. Each pair of adjacent driving electrodes TE in the second direction (or the Y-axis direction) may be electrically connected. For example, as illustrated in FIG. 7, pairs of adjacent driving electrodes TE in the second direction (or the Y-axis direction) may be connected via first connecting parts BE1.

The dummy patterns DE may be surrounded by the driving electrodes TE or the sensing electrodes RE. The dummy patterns DE may be electrically isolated from the driving electrodes TE or the sensing electrodes RE. The dummy patterns DE may be spaced apart from the driving electrodes TE or the sensing electrodes RE. The dummy patterns DE may be electrically floated.

FIG. 5 illustrates that the driving electrodes TE, the sensing electrodes RE, and the dummy patterns DE have a rhombus shape in a plan view. However, the present inventive concept is not limited thereto. For example, according to exemplary embodiments, the driving electrodes TE, the sensing electrodes RE, and the dummy patterns DE may have various other shapes such as a rectangular shape other than a rhombus shape, a non-tetragonal polygonal shape, a circular shape, or an elliptical shape in a plan view.

The sensor lines SL (TL1, TL2, and RL) may be disposed in the touch peripheral area TPA. The sensor lines SL (TL1, TL2, and RL) may include the sensing lines RL, which are connected to the sensing electrodes RE, and the first driving lines TL1 and the second driving lines TL2, which are connected to the driving electrodes TE.

Sensing electrodes RE disposed on one side of the touch sensor area TSA may be connected in a one-to-one correspondence to the sensing lines RL. For example, referring to FIG. 5, sensing electrodes RE that are electrically connected in the first direction (or the X-axis direction) at the right end of the touch sensor area TSA may be connected to the sensing lines RL. The sensing lines RL may be connected in a one-to-one correspondence to second sensor pads TP2. Accordingly, a touch driving circuit can be electrically connected to the sensing electrodes RE.

Driving electrodes TE disposed on one side of the touch sensor area TSA may be connected in a one-to-one correspondence to the first driving lines TL1, and driving electrodes TE disposed on the other side of the touch sensor area TSA may be connected in a one-to-one correspondence to the second driving lines TL2. For example, referring to FIG. 5, driving electrodes TE disposed at the lower end of the touch sensing area TSA may be connected to the first driving line TL1, and driving electrodes TE disposed at the upper end of the touch sensing area TSA may be connected to the second driving line TL2. The second driving lines TL2 may be connected to the driving electrodes TE on the upper side of the touch sensor area TSA via the outer left side of the touch sensor area TSA.

The first driving lines TL1 and the second driving lines TL2 may be connected in a one-to-one correspondence to first sensor pads TP1. Accordingly, the touch driving circuit can be electrically connected to the driving electrodes TE. Since the driving electrodes TE are connected to driving lines (TL1 and TL2) on either side of the touch sensor area TSA and thus receive touch driving signals, differences, which may occur due to RC delays in touch driving signals, can be prevented from being generated between the touch driving signals applied to driving electrodes TE disposed in the lower part of the touch sensor area TSA and the touch driving signals applied to driving electrodes TE disposed in the upper part of the touch sensor area TSA.

A first sensor pad area TPA1 where the first sensor pads TP1 are disposed may be provided on one side of a display pad area DPA where display pads DP are disposed. A second sensor pad area TPA2 where the second sensor pads TP2 are disposed may be provided on the other side of the display pad area DPA. The display pads DP may be connected to the data lines of the display panel 300.

The display pad area DPA, the first sensor pad area TPA1, and the second sensor pad area TPA2 may correspond to the pads PAD of the display panel 300 of FIG. 3. A circuit board may be disposed on the display pads DP, the first sensor pads TP1, and the second sensor pads TP2. The display pads DP, the first sensor pads TP1, and the second sensor pads DP2 may be electrically connected to the circuit board via a low-resistance, high-reliability material such as, for example, an ACF or an SAP. Accordingly, the display pad area DPA, the first sensor pad area TPA1, and the second sensor pad area TPA2 can be electrically connected to the touch driving circuit, which is disposed on the circuit board.

FIG. 6A is a layout view illustrating first, second, and third display areas and a second non-display area of a display panel according to an exemplary embodiment of the present inventive concept. For example, FIG. 6A is an enlarged layout view illustrating an example of area A of FIG. 3, and illustrates parts of the first, second, and third display areas DA1, DA2, and DA3 and part of the second non-display area NDA2 near the first corner portion CS1 of FIG. 3.

Referring to FIG. 6A, an intersecting point CRP between the first and second bending lines BL1 and BL2 may be disposed in the first display area DA1. In this case, the first display area DA1 may be disposed in the front portion FS, the first and second side portions SS1 and SS2, and the first corner portion CS1, the second display area DA2 may be disposed in the first and second side portions SS1 and SS2 and the first corner portion CS1, the third display area DA3 may be disposed in the first and second side portions SS1 and SS2 and the first corner portion CS1, and the second non-display area NDA2 may be disposed in the first and second side portions SS1 and SS2 and the first corner portion CS1. The first corner portion CS1 may correspond to the lower left quadrant defined by the intersection of the first bending line BL1 and the second bending line BL2. For example, in an exemplary embodiment, the first corner portion CS1 may refer to the part of the display panel 300 disposed in the lower left quadrant defined by the intersection of the first bending line BL1 and the second bending line BL2.

The first display area DA1 may include first emission areas. Also, since the first display area DA1 overlaps the touch sensor area TSA, the first display area DA1 may include the sensor electrodes SE. As illustrated in FIG. 5, the sensor electrodes SE may include the driving electrodes TE and the sensing electrodes RE. The first emission areas, the driving electrodes TE, and the sensing electrodes RE of the first display area DA1 will be described in further detail below with reference to FIGS. 7 and 8.

The second display area DA2 may be disposed on the outside of the first display area DA1. The second display area DA2 may include second emission areas and first sensor lines SL1. The first sensor lines SL1 may be defined as being sensor lines disposed in the second display area DA2 and connected to at least some of the sensor electrodes SE of the first display area DA1. For example, the first sensor lines SL1 may include first driving lines TL1 which are connected to driving electrodes TE in part of the first display area DA1 that adjoins the second display area DA2, and second driving lines TL2 which are connected to driving electrodes TE in the upper part of the first display area DA1. The first sensor lines SL1 may be disposed not only in the second display area DA2, but also in the first non-display area NDA1 and/or the second non-display area NDA2, which is disposed adjacent to the first and second display areas DA1 and DA2.

The third display area DA3 may be disposed on the outside of the second display area DA2. The third display area DA3 may include cutout portions CP which are isolated from one another, and third emission areas which are disposed in the cutout portions CP.

First ends of the cutout portions CP may be connected to the second display area DA2, and second ends of the cutout portions CP may be connected to the second non-display area NDA2. In an exemplary embodiment, the cutout portions CP may have a substantially trapezoidal shape in a plan view. The width of the cutout portions CP may gradually increase or decrease from the second display area DA2 to the second non-display area NDA2. Alternatively, in an exemplary embodiment, the cutout portions CP may have a rectangular shape in a plan view.

The width of a middle part of the third display area DA3 may be greater than the width of both ends of the third display area DA3. For example, the third display area DA3 may be formed in the shape of a crescent moon in a plan view. Accordingly, each pair of adjacent cutout portions CP in the third display area DA3 may have different sizes. For example, the size of the cutout portions CP may gradually decrease from the center of the third display area DA3 to either end of the third display area DA3.

The cutout portions CP may be formed by cutting the display panel 300 with light emitted by a laser. Accordingly, first cutout gaps CG1 may be formed between the cutout portions CP. Since the third emission areas are disposed in the cutout portions CP, the maximum width of the cutout portions CP may be greater than the maximum width of the first cutout gaps CG1.

The cutout portions CP and the third emission areas of the third display area DA3 will be described in further detail below with reference to FIGS. 15 and 16.

In a case in which a non-display area that does not display an image is disposed between the first and third display areas DA1 and DA3, a user may recognize the existence of the non-display area between the first and third display areas DA1 and DA3 when an image is displayed in the first and third display areas DA1 and DA3. That is, the user may recognize parts of the image displayed in the first and third display areas DA1 and DA3 as being apart from each other. However, according to exemplary embodiments, since the second display area DA2, which includes second emission areas, is disposed between the first and third display areas DA1 and DA3, as illustrated in FIG. 6A, a non-display area between the first and third display areas DA1 and DA3 can be prevented from being visible to the user. The second emission areas of the second display area DA2 will be described in further detail below with reference to FIGS. 9 through 14.

The second non-display area NDA2 may be disposed on the outside of the third display area DA3. The second non-display area NDA2 may include cutout connecting portions CBP which are connected to the cutout portions CP, and a cutout common pattern CCP which is connected in common to the cutout connecting portions CBP. First ends of the cutout connecting portions CBP may be connected to the cutout portions CP, and second ends of the cutout connecting portions CBP may be connected to the cutout common pattern CCP. The cutout common pattern CCP may be disposed on an outermost side of the second non-display area NDA2.

The cutout connecting portions CBP may be formed by cutting the display panel 300 via light emitted by a laser. Second cutout gaps CG2 may be formed between the cutout connecting portions CBP.

The maximum width of the cutout connecting portions CBP may be greater than or smaller than the maximum width of the second cutout gaps CG2. The cutout connecting portions CBP may be formed in a winding shape including multiple bent portions. Thus, the cutout connecting portions CBP may be designed to be suitable for stretching or contraction.

Since the cutout portions CP, which are disposed in the third display area DA3, and the cutout connecting portions CBP, which are disposed in the second non-display area NDA2, are designed to be suitable for stretching or contraction, as illustrated in FIG. 6A, strain and stress applied to the emission areas of the third display area DA3 by double curvature can be reduced.

Parts of the first, second, and third display areas DA1, DA2, and DA3 and part of the second non-display area NDA2, disposed in each of the second through fourth corner portions CS2 through CS4 of FIG. 3, may be similar to those illustrated in FIG. 6A. However, the part of the second display area DA2 disposed in the second corner portion CS2 may differ from the part of the second display area DA2 disposed in the first corner portion CS1 in that the first sensor lines SL1 include the sensing lines RL, which are connected to the sensing electrodes RE in the first display area DA1, instead of the second driving lines TL2. Also, the part of the second display area DA2 disposed in the third corner portion CS3 may differ from the part of the second display area DA2 disposed in the first corner portion CS1 in that the first sensor lines SL1 includes the sensing lines RL and the first sensor lines SL1 do not include the first driving lines TL1. Also, the part of the second display area DA2 disposed in the fourth corner portion CS4 may differ from the part of the second display area DA2 disposed in the first corner portion CS1 in that the first sensor lines SL1 include the second driving lines and do not include the first driving lines TL1 there exists no first sensor lines SL1.

In an exemplary embodiment, the display device 10 may include the display panel 300, which may include the first display area DA1, the second display area DA2, and the third display area DA3. The first display area DA1 may include a plurality of first emission areas (see, e.g., EA1 in FIG. 7) and a plurality of sensor electrodes SE, the second display area DA2 may include a plurality of second emission areas (see, e.g., EA2 in FIGS. 9-14) and a plurality of first sensor lines SL1 electrically connected to at least some of the sensor electrodes SE, and the third display area DA3 may include a plurality of third emission areas (see, e.g., EA3 in FIG. 15) and a plurality of third sensor lines (see, e.g., SL3 in FIG. 22) connected to at least some of the sensor electrodes SE. The second display area DA2 may be disposed in a corner portion (e.g., CS1) of the display device 10 between the first display area DA1 and the third display area DA3.

Figure 6B:
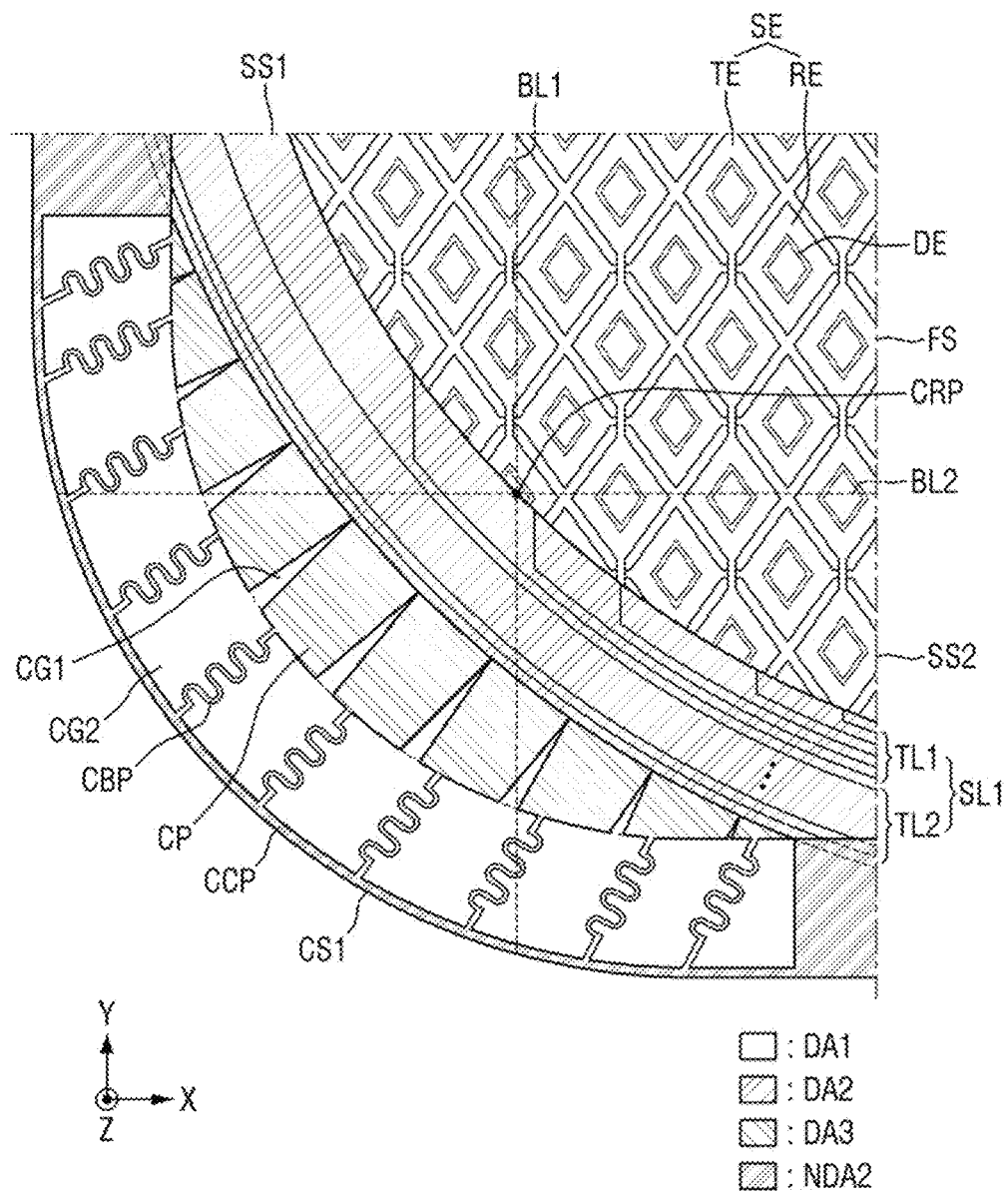
FIG. 6B is a layout view illustrating first, second, and third display areas and a second non-display area of a display panel according to an exemplary embodiment of the present inventive concept.
Figure 6C:
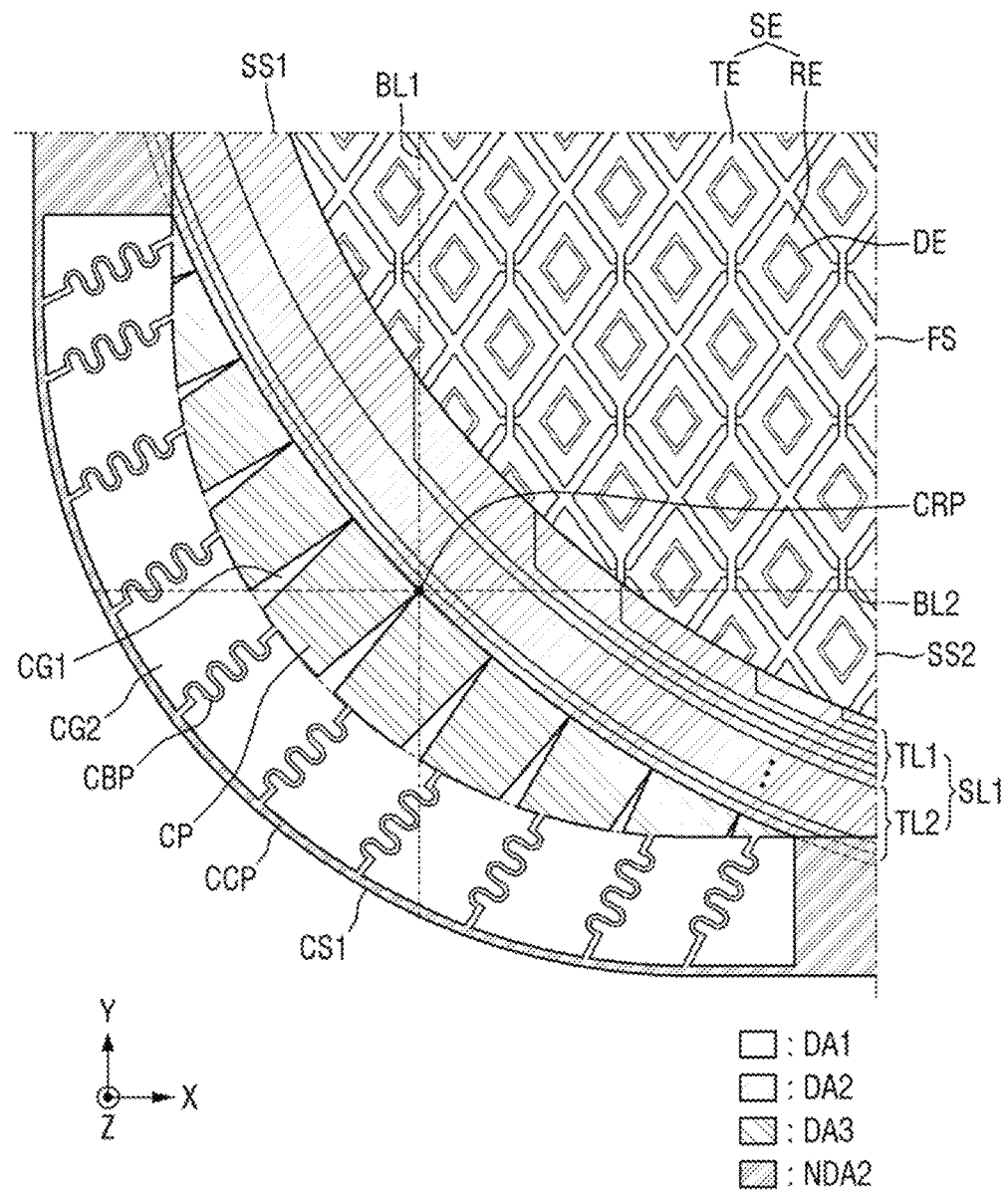
FIG. 6C is a layout view illustrating first, second, and third display areas and a second non-display area of a display panel according to an exemplary embodiment of the present inventive concept.

FIG. 6B is a layout view illustrating first, second, and third display areas and a second non-display area of a display panel according to an exemplary embodiment of the present inventive concept. FIG. 6C is a layout view illustrating first, second, and third display areas and a second non-display area of a display panel according to an exemplary embodiment of the present inventive concept. FIGS. 6B and 6C are enlarged layout views illustrating other examples of the area A of FIG. 3. For convenience of explanation, FIGS. 6B and 6C will be described hereinafter with the focus being primarily on the differences compared to FIG. 6A, and a further description of elements and technical aspects previously described may be omitted.

Referring to FIG. 6B, an intersecting point CRP between first and second bending lines BL1 and BL2 may be disposed at the boundary between first and second display areas DA1 and DA2. Alternatively, referring to FIG. 6C, the intersecting point CRP between the first and second bending lines BL1 and BL2 may be disposed at the boundary between the second display area DA2 and a third display area DA3. Alternatively, in an exemplary embodiment, the intersecting point CRP between the first and second bending lines BL1 and BL2 may be disposed in the second or third display area DA2 or DA3.

FIG. 7 is a layout view illustrating the sensor electrodes and the first emission areas in the first display area of FIG. 6A.

Referring to FIG. 7, the driving electrodes TE, the sensing electrodes RE, and the dummy patterns DE may be disposed in the same layer and spaced apart from one another. That is, gaps may be formed between the driving electrodes TE and the sensing electrodes RE.

The dummy patterns DE may also be disposed in the same layer as the driving electrodes TE and the sensing electrodes RE. That is, gaps may be formed between the driving electrodes TE and the dummy patterns DE and between the sensing electrodes RE and the dummy patterns DE.

The first connecting parts BE1 may be disposed in a different layer from the driving electrodes TE and the sensing electrodes RE. The first connecting parts BE1 may be bent at least once. FIG. 7 illustrates that each of the first connecting parts BE1 is formed in the shape of an angle bracket (e.g., "<" or ">"), but the planar shape of the first connecting parts BE1 is not particularly limited. Since the pairs of adjacent driving electrodes TE in the second direction (or the Y-axis direction) are connected by multiple first connecting parts BE1, the driving electrodes TE can be stably connected in the second direction (or the Y-axis direction), even if one of the first connecting parts BE1 is disconnected. FIG. 7 illustrates that two adjacent driving electrodes TE are connected by one first connecting part BE1, but the number of first connecting parts BE1 is not particularly limited.

The first connecting parts BE1 may be disposed in a different layer from the driving electrodes TE and the sensing electrodes RE. The first connecting parts BE1 may overlap, in the third direction (or the Z-axis direction), their respective pairs of adjacent driving electrodes TE in the second direction (or the Y-axis direction). The first connecting parts BE1 may overlap the sensing electrodes RE in the third direction (or the Z-axis direction). One side of each of the first connecting parts BE1 may be connected to one of a pair of adjacent driving electrodes TE in the second direction (or the Y-axis direction) via a first touch contact hole TCNT1, and the other side of each of the first connecting parts BE1 may be connected to the other driving electrode TE via another first touch contact hole TCNT1.

Due to the presence of the first connecting parts BE1, the driving electrodes TE and the sensing electrodes RE can be electrically isolated at the intersections therebetween. As a result, mutual capacitances can be formed between the driving electrodes TE and the sensing electrodes RE.

The driving electrodes TE, the sensing electrodes RE, and the first connecting parts BE1 may be formed in a mesh or fishnet structure in a plan view. Also, the dummy patterns DE may be formed in a mesh or fishnet structure in a plan view. Accordingly, in an exemplary embodiment, the driving electrodes TE, the sensing electrodes RE, the first connecting parts BE1, and the dummy patterns DE do not overlap first emission areas EA1. Thus, the luminance of light emitted from the first emission areas EA1 can be prevented from decreasing due to being blocked by the driving electrodes TE, the sensing electrodes RE, the first connecting parts BE1, and the dummy patterns DE.

Each of the first emission areas EA1 may include first, second, third, and fourth sub-emission areas SEA1, SEA2, SEA3, and SEA4, which emit light of first, second, third, and fourth colors, respectively. For example, the first color may be red, the second and fourth colors may be green, and the third color may be blue.

The first sub-emission areas SEA1, second sub-emission areas SEA2, third sub-emission areas SEA3, and fourth sub-emission areas SEA4 may have a rhombus or rectangular shape in a plan view. However, the present inventive concept is not limited thereto. For example, according to exemplary embodiments, the first sub-emission areas SEA1, the second sub-emission areas SEA2, the third sub-emission areas SEA3, and the fourth sub-emission areas SEA4 may have various other shapes such as a non-tetragonal polygonal shape, a circular shape, or an elliptical shape in a plan view. FIG. 7 illustrates that among the first sub-emission areas SEA1, the second sub-emission areas SEA2, the third sub-emission areas SEA3, and the fourth sub-emission areas SEA4, the third sub-emission areas SEA3 are largest in size and the second sub-emission areas SEA2 and the fourth sub-emission areas SEA4 are smallest in size. However, the present inventive concept is not limited thereto.

The second sub-emission areas SEA2 and the fourth sub-emission areas SEA4 may be arranged in odd-numbered rows. The second sub-emission areas SEA2 and the fourth sub-emission areas SEA4 may be arranged adjacent to one another in the first direction (or the X-axis direction) in each of the odd-numbered rows. The second sub-emission areas SEA2 and the fourth sub-emission areas SEA4 may be alternately arranged in each of the odd-numbered rows. Each of the second sub-emission areas SEA2 may have short sides extending in a fifth direction DR5 and long sides (e.g., relatively longer than the short sides) in a fourth direction DR4. Each of the fourth sub-emission areas SEA4 may have long sides extending in the fifth direction DR5 and short sides (e.g., relatively shorter than the long sides) extending in the fourth direction DR4. The fifth direction DR5 may be a direction inclined at an angle of about 45° between the first direction (or the X-axis direction) and the second direction (or the Y-axis direction). The fourth direction DR4 may be a direction that is orthogonal to the fifth direction DR5.

The first sub-emission areas SEA1 and the third sub-emission areas SEA3 may be arranged in even-numbered rows. The first sub-emission areas SEA1 and the third sub-emission areas SEA3 may be arranged adjacent to one another in the first direction (or the X-axis direction) in each of the even-numbered rows. The first sub-emission areas SEA1 and the third sub-emission areas SEA3 may be alternately arranged in each of the even-numbered rows.

The second sub-emission areas SEA2 and the fourth sub-emission areas SEA4 may be arranged in odd-numbered columns. The second sub-emission areas SEA2 and the fourth sub-emission areas SEA4 may be arranged adjacent to one another in the second direction (or the Y-axis direction) in each of the odd-numbered columns.

The first sub-emission areas SEA1 and the third sub-emission areas SEA3 may be arranged in even-numbered columns. The first sub-emission areas SEA1 and the third sub-emission areas SEA3 may be arranged adjacent to one another in each of the even-numbered columns. The first sub-emission areas SEA1 and the third sub-emission areas SEA3 may be alternately arranged in each of the even-numbered columns.

Figure 8:
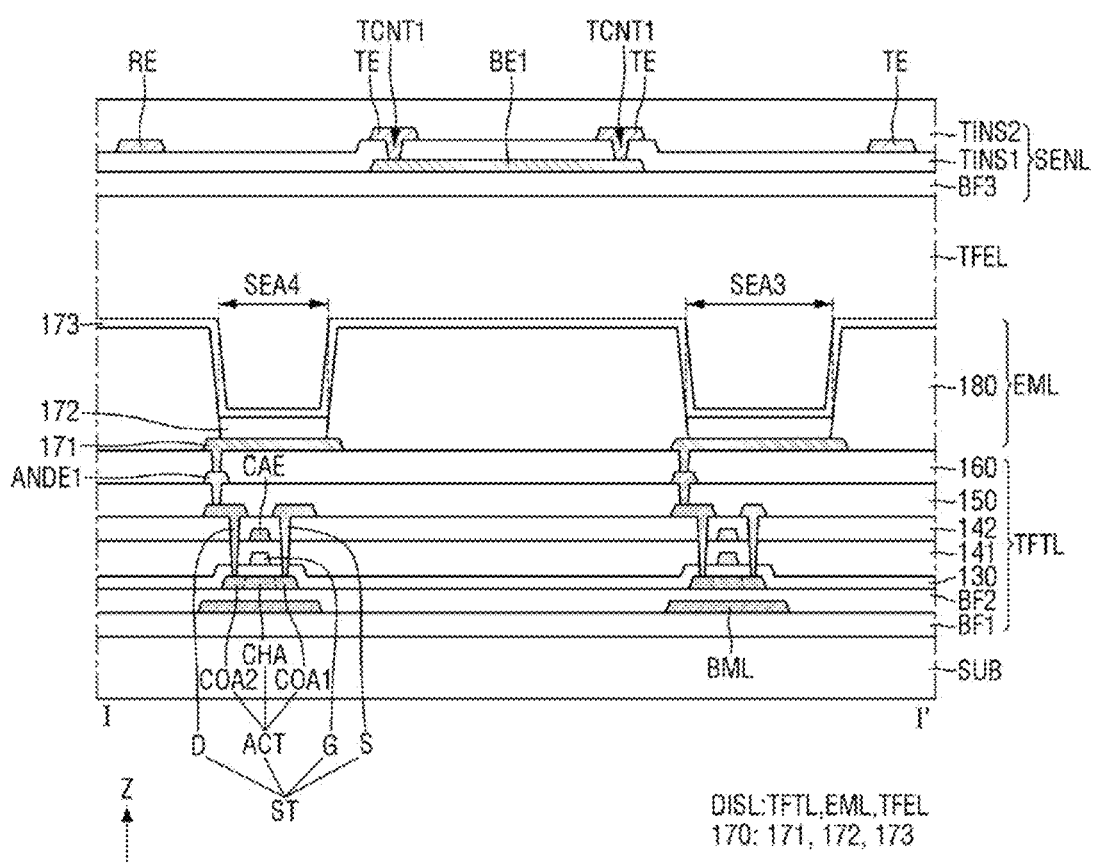
FIG. 8 is a cross-sectional view taken along line I-I' of FIG. 7.

FIG. 8 is a cross-sectional view taken along line I-I' of FIG. 7.

Referring to FIG. 8, the display layer DISL, which includes the TFT layer TFTL, the light-emitting element layer EML, and the encapsulation layer TFEL, may be disposed on the substrate SUB, and the sensor electrode layer SENL, which includes the sensor electrodes SE, may be disposed on the display layer DISL.

A first buffer film BF1 may be disposed on a first surface of the substrate SUB, and a second buffer film BF2 may be disposed on the first buffer film BF1. The first and second buffer films BF1 and BF2 may protect TFTs ST of the TFT layer TFTL and a light-emitting layer 172 of the light-emitting element layer EML from moisture that may penetrate through the substrate SUB, which may be susceptible to moisture. For example, each of the first and second buffer films BF1 and BF2 may be formed as a multilayer film in which one or more inorganic film selected from among, for example, a silicon nitride layer, a silicon oxynitride layer, a silicon oxide layer, a titanium oxide layer, and an aluminum oxide layer are alternately stacked. In an exemplary embodiment, one of the first and second buffer films BF1 and BF2 may be omitted.

First light-blocking layers BML may be disposed on the first buffer film BF1. The first light-blocking layers BML may be formed as a single or multilayer film including, for example, molybdenum (Mo), aluminum (Al), chromium (Cr), gold (Au), titanium (Ti), nickel (Ni), neodymium (Nd), copper (Cu), or an alloy thereof. Alternatively, the first light-blocking layers BML may be an organic film including a black pigment.

Active layers ACT of the TFTs ST may be disposed on the second buffer film BF2. The active layers ACT may include, for example, polycrystalline silicon, monocrystalline silicon, low-temperature polycrystalline silicon (LTPS), amorphous silicon, or an oxide semiconductor material. In a case in which the active layers ACT include polycrystalline silicon or an oxide semiconductor material, ion doped regions of the active layers ACT may be conductive areas having conductivity.

The active layers ACT may overlap the first light-blocking layers BML in the third direction (or the Z-axis direction). Since light incident through the substrate SUB can be blocked by the first light-blocking layers BML, leakage currents can be prevented from flowing into the active layers ACT due to the incident light.

A gate insulating film 130 may be formed on the active layers ACT. The gate insulating film 130 may be formed as an inorganic film such as, for example, a silicon nitride layer, a silicon oxynitride layer, a silicon oxide layer, a titanium oxide layer, or an aluminum oxide layer.

Gate electrodes G of the TFTs ST may be disposed on the gate insulating film 130. The gate electrodes G of the TFTs ST may overlap the active layers ACT in the third direction (or the Z-axis direction). Parts of the active layers ACT that overlap the gate electrodes G in the third direction (or the Z-axis direction) may be channel areas CHA. The gate electrodes G may be formed as single or multilayer films including, for example, Mo, Al, Cr, Au, Ti, Ni, Nd, Cu, or an alloy thereof.

A first interlayer insulating film 141 may be disposed on the gate electrodes G. The first interlayer insulating film 141 may be formed as an inorganic film such as, for example, a silicon nitride layer, a silicon oxynitride layer, a silicon oxide layer, a titanium oxide layer, or an aluminum oxide layer. The first interlayer insulating film 141 may include a plurality of inorganic films.

Capacitor electrodes CAE may be disposed on the first interlayer insulating film 141. The capacitor electrodes CAE may overlap the gate electrodes G in the third direction (or the Z-axis direction). The capacitor electrodes CAE may be formed as single or multilayer films including, for example, Mo, Al, Cr, Au, Ti, Ni, Nd, Cu, or an alloy thereof.

A second interlayer insulating film 142 may be disposed on the capacitor electrodes CAE. The second interlayer insulating film 142 may be formed as an inorganic film such as, for example, a silicon nitride layer, a silicon oxynitride layer, a silicon oxide layer, a titanium oxide layer, or an aluminum oxide layer. The second interlayer insulating film 142 may include a plurality of inorganic films.

First electrodes S and second electrodes D of the TFTs ST may be disposed on the second interlayer insulating film 142. The first electrodes S and the second electrodes D may be formed as single or multilayer films including, for example, Mo, Al, Cr, Au, Ti, Ni, Nd, Cu, or an alloy thereof. The first electrodes S and the second electrodes D of the TFTs ST may correspond to source and drain electrodes of the TFTs ST.

The first electrodes S of the TFTs ST may be connected to first conductive areas COA1, which are disposed on first sides of the channel areas CHA of the active layers ACT, through contact holes that penetrate the gate insulating film 130, the first interlayer insulating film 141, and the second interlayer insulating film 142. The second electrodes D of the TFTs ST may be connected to second conductive areas COA2, which are disposed on second sides of the channel areas CHA of the active layers ACT, through contact holes that penetrate the gate insulating film 130, the first interlayer insulating film 141, and the second interlayer insulating film 142.

A first organic film 150 for planarizing height differences formed by the TFTs ST may be disposed on the first electrodes S and the second electrodes D. The first organic film 150 may be formed as an organic film including, for example, an acrylic resin, an epoxy resin, a phenolic resin, a polyamide resin, or a polyimide resin.

First connecting electrodes ANDE1 may be disposed on the first organic film 150. The first connecting electrodes ANDE1 may be connected to the second electrodes D of the TFTs ST through contact holes that penetrate the first organic film 150. The first connecting electrodes ANDE1 may be formed as single or multilayer films including, for example, Mo, Al, Cr, Au, Ti, Ni, Nd, Cu, or an alloy thereof.

A second organic film 160 may be disposed on the first connecting electrodes ANDE1. The second organic film 160 may be formed as an organic film including, for example, an acrylic resin, an epoxy resin, a phenolic resin, a polyamide resin, or a polyimide resin.

FIG. 8 illustrates that the TFTs ST are formed as top-gate TFTs in which the gate electrodes G are disposed above the active layers ACT. However, the present inventive concept is not limited thereto. For example, according to exemplary embodiments, the TFTs ST may be formed as bottom-gate TFTs in which the gate electrodes G are disposed below the active layers ACT or as double-gate TFTs in which the gate electrodes G are disposed both above and below the active layers ACT.

The light-emitting element layer EML is disposed on the TFT layer TFTL. The light-emitting element layer EML may include light-emitting elements 170 and a bank 180.

Each of the light-emitting elements 170 may include a first light-emitting electrode 171, a light-emitting layer 172, and a second light-emitting electrode 173. Each of the first emission areas EA1 may be a region in which the first light-emitting electrode 171, the light-emitting layer 172, and the second light-emitting electrode 173 are sequentially stacked so that holes from the first light-emitting electrode 171 and electrons from the second light-emitting electrode 173 can combine in the light-emitting layer 172 to emit light. In this case, the first light-emitting electrode 171 may be an anode electrode, and the second light-emitting electrode 173 may be a cathode electrode.

The first light-emitting electrodes 171 may be formed on the second organic film 160. The first light-emitting electrodes 171 may be connected to the first connecting electrodes ANDE1 via contact holes that penetrate the second organic film 160.

In a top emission structure in which the light-emitting elements 170 emit light in a direction from the light-emitting layers 172 to the second light-emitting electrode 173 of the light-emitting elements 170, the first light-emitting electrodes 171 may be formed as single layers of, for example, Mo, Ti, Cu, or Al, or may be formed as, for example, stacks of Al and Ti (e.g., Ti/Al/Ti), stacks of Al and ITO (e.g., ITO/Al/ITO), layers of a silver (Ag)-palladium (Pd)-copper (Cu) (APC) alloy, or stacks of an APC alloy and ITO (e.g., ITO/APC/ITO).

The bank 180 defines the first emission areas EA1. To this end, the bank 180 may be formed on the second organic film 160 to expose parts of the first light-emitting electrodes 171 of the light-emitting elements 170. The bank 180 may cover the edges of each of the first light-emitting electrodes 171. The bank 180 may be disposed in contact holes that penetrate the second organic film 160. As a result, the contact holes of the second organic film 160 may be filled with the bank 180. The bank 180 may be formed as an organic film including, for example, an acrylic resin, an epoxy resin, a phenolic resin, a polyamide resin, or a polyimide resin.

The light-emitting layers 172 are formed on the first light-emitting electrodes 171. The light-emitting layers 172 may include an organic material that emits light of a predetermined color. For example, the light-emitting layers 172 may each include a hole transport layer, an organic material layer, and an electron transport layer. In this example, the organic material layer may include a host and a dopant. The organic material layer may include a material capable of emitting light of a predetermined color and may be formed of a phosphorescent material or a fluorescent material.

For example, the organic material layers of light-emitting layers 172 formed in the first sub-emission areas SEA1, which emit light of the first color, may be formed of a phosphorescent material including a host material including, for example, 4,4'-bis(N-carbazole)-1,1'-biphenyl (CBP) or 1,3-bis(carbazol-9-yl)benzene (mCP), and at least one dopant material selected from among, for example, bis(1-phenylisoquinoline)acetylacetonate iridium (PIQIr(acac)), bis (1-phenylquinoline)acetylacetonate iridium (PQIr(acac)), tris(1-phenylquinoline)iridium (PQIr), and platinum octaethylporphyrin (PtOEP). In an exemplary embodiment, the organic material layers of light-emitting layers 172 formed in the first sub-emission areas SEA1 may be formed of a fluorescent material including, for example, PBD: Eu(DBM)$_3$(Phen) or perylene. However, the present inventive concept is not limited to these examples.

The organic material layers of light-emitting layers 172 formed in the second sub-emission areas SEA2, which emit light of the second color, may be formed of, for example, a phosphorescent material including a host material including, for example, CBP or mCP, and a dopant material including, for example, fac-tris(2-phenylpyridine)iridium (Ir(ppy)$_3$). In an exemplary embodiment, the organic material layers of the light-emitting layers 172 formed in the second sub-emission areas SEA2 may be formed of a fluorescent material including, for example, tris(8-hydroxyquinolino)aluminum (Alq$_3$). However, the present inventive concept is not limited to these examples.

The organic material layers of light-emitting layers 172 formed in the third sub-emission areas SEA3, which emit light of the third color, may be formed of a phosphorescent material including a host material including, for example, CBP or mCP, and a dopant material including, for example, (4,6-F$_2$ppy)$_2$Irpic or L2BD111. However, the present inventive concept is not limited to this example.

The second light-emitting electrode 173 may be formed on the light-emitting layers 172. The second light-emitting electrode 173 may cover the light-emitting layers 172. The second light-emitting electrode 173 may be a common layer formed in common for all display pixels. A capping layer may be formed on the second light-emitting electrode 173.

In the top emission structure, the second light-emitting electrode 173 may be formed of a transparent conductive oxide (TCO) material such as, for example, ITO or IZO, or a translucent metallic material such as, for example, magnesium (Mg), Ag, or an alloy thereof. In a case in which the second light-emitting electrode 173 is formed of a translucent metallic material, the emission efficiency of the light-emitting elements 170 can be improved due to microcavities.

The light-emitting layers 172 may be disposed on the top surfaces of the first light-emitting electrodes 171 and on inclined surfaces of the bank 180. The second light-emitting electrodes 173 may be disposed on the top surfaces of the light-emitting layers 172 and on the inclined surfaces of the bank 180.

The encapsulation layer TFEL may be formed on the light-emitting element layer EML. The encapsulation layer TFEL may include at least one inorganic film, which may prevent the penetration of oxygen or moisture into the light-emitting element layer EML. The encapsulation layer TFEL may also include at least one organic film, which may protect the light-emitting element layer EML from foreign materials such as dust. The inorganic film may be formed as a multilayer film in which one or more inorganic films selected from among, for example, a silicon nitride layer, a silicon oxynitride layer, a silicon oxide layer, a titanium oxide layer, and an aluminum oxide layer are alternately stacked. The organic film may be formed of, for example, an acrylic resin, an epoxy resin, a phenolic resin, a polyamide resin, or a polyimide resin.

In a case in which a second substrate is provided on the light-emitting element layer EML instead of the encapsulation layer TFEL, the space between the light-emitting element layer EML and the second substrate may be empty in a vacuum or may have a filler film disposed therein. The filler film may be, for example, an epoxy filler film or a silicone filler film.

The sensor electrode layer SENL is disposed on the encapsulation layer TFEL. The sensor electrode layer SENL may include light-blocking films and the sensor electrodes SE. As described above, the sensor electrodes SE may include driving electrodes TE and sensing electrodes RE.

A third buffer film BF3 may be disposed on the encapsulation layer TFEL. The third buffer film BF3 may be a layer having insulation and optical functions. The third buffer film BF3 may include at least one inorganic film. For example, the third buffer film BF3 may be formed as a multilayer film in which one or more inorganic films selected from among, for example, a silicon nitride layer, a silicon oxynitride layer, a silicon oxide layer, a titanium oxide layer, and an aluminum oxide layer are alternately stacked.

The first connecting parts BE1 may be disposed on the third buffer film BF3. The first connecting parts BE1 may be formed as single layers of, for example, Mo, Ti, Cu, or Al, or may be formed as, for example, stacks of Al and Ti (e.g., Ti/Al/Ti), stacks of Al and ITO (e.g., ITO/Al/ITO), layers of an APC alloy, or stacks of an APC alloy and ITO (e.g., ITO/APC/ITO).

A first sensor insulating film TINS1 may be disposed on the first connecting parts BE1. The first sensor insulating film TINS1 may be a layer having insulation and optical functions. The first sensor insulating film TINS1 may be formed as an inorganic film such as, for example, a silicon nitride layer, a silicon oxynitride layer, a silicon oxide layer, a titanium oxide layer, or an aluminum oxide layer.

The driving electrodes TE and the sensing electrodes RE may be disposed on the first sensor insulating film TINS1. In an exemplary embodiment, the driving electrodes TE and the sensing electrodes RE do not overlap the first emission areas EA1. The driving electrodes TE and the sensing electrodes RE may be formed as single layers of, for example, Mo, Ti, Cu, or Al, or may be formed, for example, as stacks of Al and Ti (e.g., Ti/Al/Ti), stacks of Al and ITO (e.g., ITO/Al/ITO), layers of an APC alloy, or stacks of an APC alloy and ITO (e.g., ITO/APC/ITO).

A second sensor insulating film TINS2 may be disposed on the driving electrodes TE and the sensing electrodes RE. The second sensor insulating film TINS2 may be a layer having insulation and optical functions. The second sensor insulating film TINS2 may include at least one of an inorganic film and an organic film. The inorganic film may be, for example, a silicon nitride layer, a silicon oxynitride layer, a silicon oxide layer, a titanium oxide layer, or an aluminum oxide layer. The organic film may be formed of, for example, an acrylic resin, an epoxy resin, a phenolic resin, a polyamide resin, or a polyimide resin.

Figure 9:
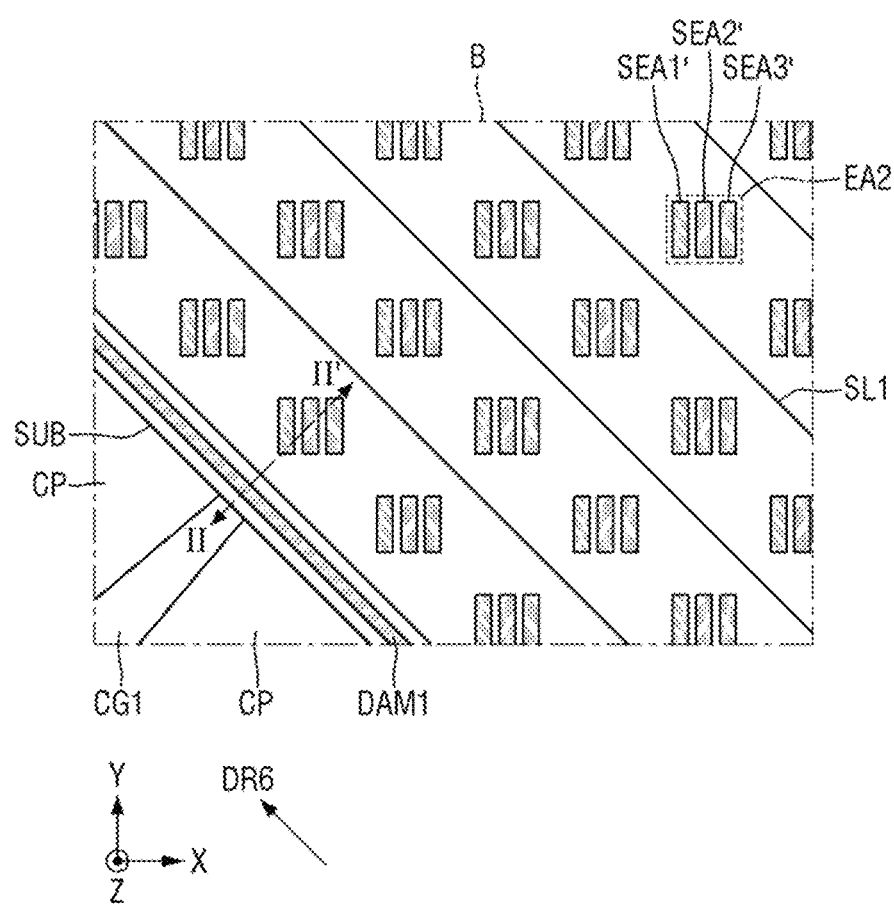
FIG. 9 is a layout view illustrating exemplary first sensor lines and exemplary second emission areas of the second display area of FIG. 6A.

FIG. 9 is a layout view illustrating exemplary first sensor lines and exemplary second emission areas of the second display area of FIG. 6A. FIG. 9 is an enlarged layout view illustrating an area B of FIG. 6A.

Referring to FIG. 9, the first sensor lines SL1 may extend in a sixth direction DR6. The sixth direction DR6 may be a direction inclined at an angle of about 135° with respect to the first direction (or the X-axis direction), but the present inventive concept is not limited thereto. The first sensor lines SL1 may be arranged in the first direction (or the X-axis direction). The distance in the first direction (or the X-axis direction) between the first sensor lines SL1, or the distance in the first direction (or the X-axis direction) between the second emission areas EA2, may be about several micrometers (um).

The second emission areas EA2 may be disposed between the first sensor lines SL1. The second emission areas EA2 may be arranged in the sixth direction DR6 between the first sensor lines SL1. One sensor line SL1 may be disposed between each pair of adjacent second emission areas EA2 in the first direction (or the X-axis direction). In an exemplary embodiment, the first sensor lines SL1 do not overlap the second emission areas EA2, as shown in FIG. 9. In an exemplary embodiment, the second emission areas EA2 may be disposed between at least one of the first sensor lines SL1 and the third emission areas disposed in the third display area DA3 (see, e.g., FIGS. 9 and 6A).

Each of the second emission areas EA2 may include first, second, and third sub-emission areas SEA1', SEA2', and SEA3', which emit light of first, second, and third colors, respectively. For example, the first color may be red, the second color may be green, and the third color may be blue.

First sub-emission areas SEA1', second sub-emission areas SEA2', and third sub-emission areas SEA3' may be arranged in the first direction (or the X-axis direction). The first sub-emission areas SEA1', the second sub-emission areas SEA2', and the third sub-emission areas SEA3' may have a rectangular shape in a plan view, but the present inventive concept is not limited thereto. For example, the first sub-emission areas SEA1', the second sub-emission areas SEA2', and the third sub-emission areas SEA3' may have a rectangular shape having short sides extending in the first direction (or the X-axis direction) and long sides (e.g., relatively longer than the short sides) extending in the second direction (or the Y-axis direction) in a plan view, but the present inventive concept is not limited thereto. Alternatively, the first sub-emission areas SEA1', the second sub-emission areas SEA2', and the third sub-emission areas SEA3' may have various other shapes such as, for example, a non-tetragonal polygonal shape, a circular shape, or an elliptical shape in a plan view. FIG. 9 illustrates that the first sub-emission areas SEA1', the second sub-emission areas SEA2', and the third sub-emission areas SEA3' have substantially the same size, but the present inventive concept is not limited thereto. For example, according to exemplary embodiments, the first sub-emission areas SEA1', the second sub-emission areas SEA2', and the third sub-emission areas SEA3' may have different sizes.

Figure 17:
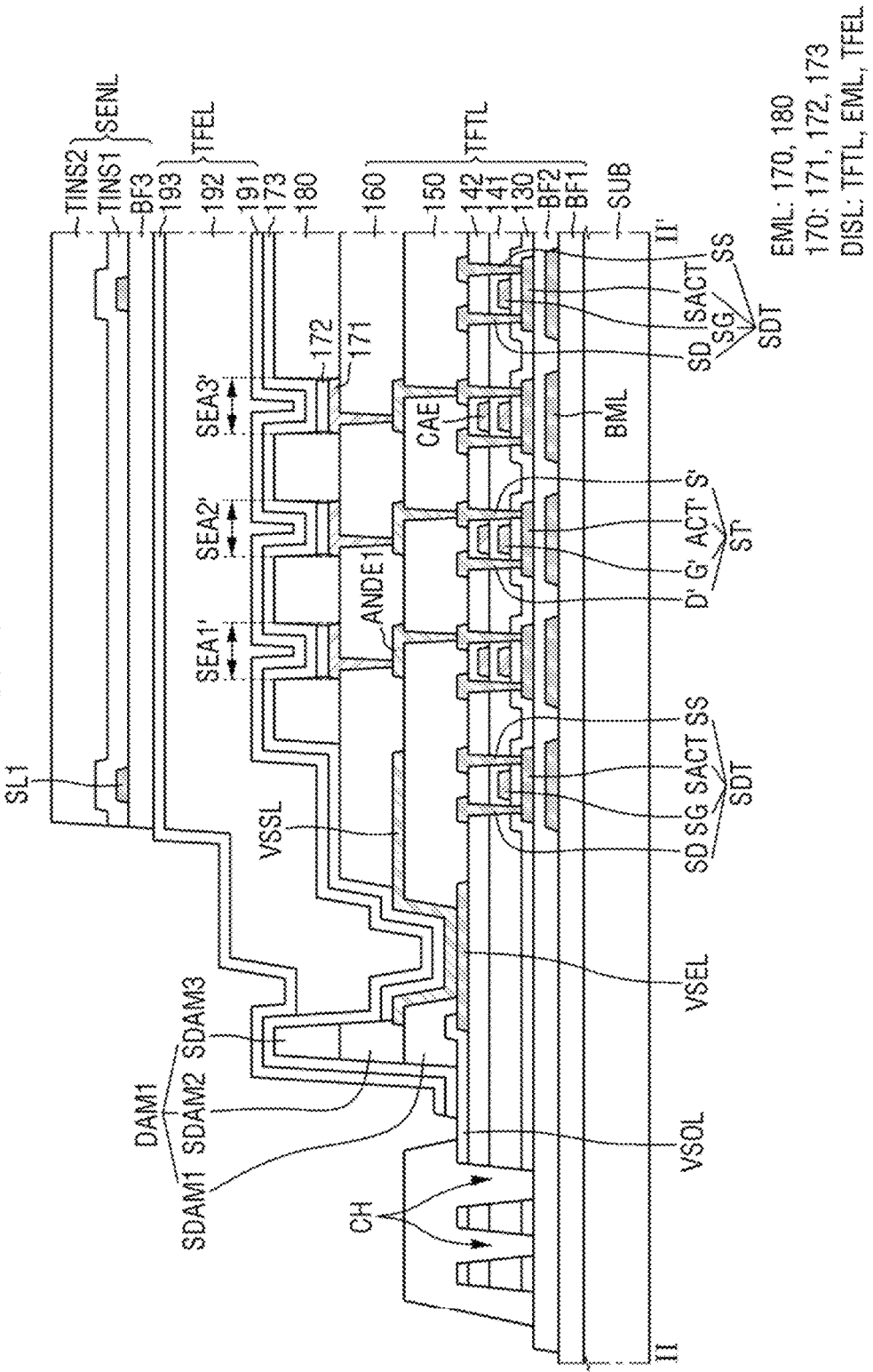
FIG. 17 is a cross-sectional view taken along line II-II' of FIG. 9 according to an exemplary embodiment of the present inventive concept.

A first dam DAM1 may be disposed on the left edge of the second display area DA2. The first dam DAM1 may be disposed between at least one of the first sensor lines SL1 and the cutout portions CP in which the third emission areas are disposed. The first dam DAM1 may be a structure for preventing the spillover of an organic film from the encapsulation layer TFEL, as illustrated in FIG. 17. The first dam DAM1 may extend in the sixth direction DR6.

The cutout portions CP of the third display area DA3 may be disposed on the outside of the second display area DA2.

Among the first sensor lines SL1 and the second emission areas EA2, if only the first sensor lines SL1 are disposed in the second display area DA2, and the second emission areas EA2 are not disposed in the second display area DA2, the second display area DA2 may be a non-display area that does not display an image.

As illustrated in FIG. 9, the second display area DA2, which includes the second emission areas EA2, is disposed between part of the first display area DA1 in the front portion FS and part of the third display area DA3 in the first corner portion CS1. Thus, a non-display area between the part of the first display area DA1 in the front portion FS and the part of the third display area DA3 in the first corner portion CS1 can be prevented from becoming visible to the user.

Figure 10:
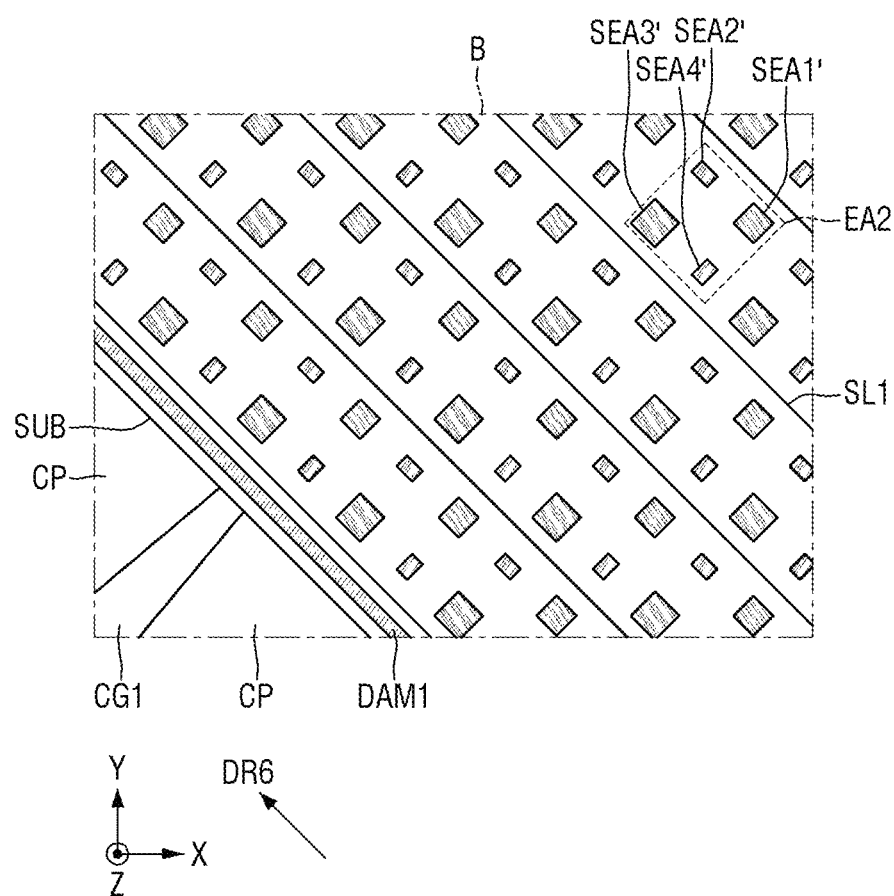
FIG. 10 is a layout view illustrating exemplary first sensor lines and exemplary second emission areas of the second display area of FIG. 6A.

FIG. 10 is a layout view illustrating exemplary first sensor lines and exemplary second emission areas of the second display area of FIG. 6A.

The exemplary embodiment of FIG. 10 differs from the exemplary embodiment of FIG. 9 in that each of the second emission areas EA2 includes first, second, third, and fourth sub-emission areas SEA1', SEA2', SEA3', and SEA4', as illustrated in FIG. 7, instead of first, second, and third sub-emission areas SEA1', SEA2', and SEA3'. For convenience of explanation, a further description of elements and technical aspects previously described may be omitted.

Referring to FIG. 10, each of the second emission areas EA2 may include first, second, third, and fourth sub-emission areas SEA1', SEA2', SEA3', and SEA4', which emit light of first, second, third, and fourth colors, respectively. For example, the first color may be red, the second and fourth colors may be green, and the third color may be blue.

Figure 11:
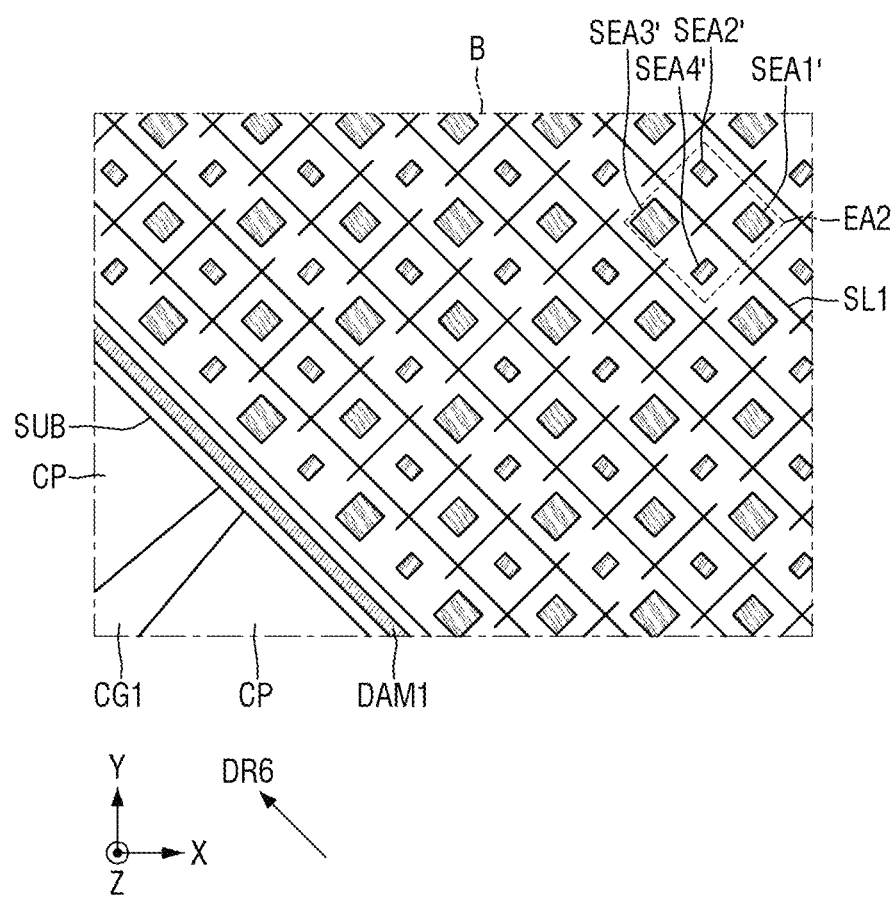
FIG. 11 is a layout view illustrating exemplary first sensor lines and exemplary second emission areas of the second display area of FIG. 6A.

First sub-emission areas SEA1' and third sub-emission areas SEA3' may be arranged in the first direction (or the X-axis direction). Second sub-emission areas SEA2' and fourth sub-emission areas SEA4' may also be arranged in the first direction (or the X-axis direction). The first sub-emission areas SEA1' and the second sub-emission areas SEA2' may be alternately arranged in the sixth direction DR6. The third sub-emission areas SEA3' and the fourth sub-emission areas SEA4' may be alternately arranged in the sixth direction DR6. FIG. 11 is a layout view illustrating exemplary first sensor lines and exemplary second emission areas of the second display area of FIG. 6A.

The exemplary embodiment of FIG. 11 differs from the exemplary embodiment of FIG. 10 in that the first sensor lines SL1 are formed in a mesh form between the first sub-emission areas SEA1', the second sub-emission areas SEA2', the third sub-emission areas SEA3', and the fourth sub-emission areas SEA4'. For convenience of explanation, a further description of elements and technical aspects previously described may be omitted.

Referring to FIG. 11, the first sensor lines SL1 may be disposed between the second sub-emission areas SEA2' and the third sub-emission areas SEA3', between the first sub-emission areas SEA1' and the fourth sub-emission areas SEA4', and between the first sub-emission areas SEA1' and the second sub-emission areas SEA2', thus forming a mesh structure.

Figure 12:
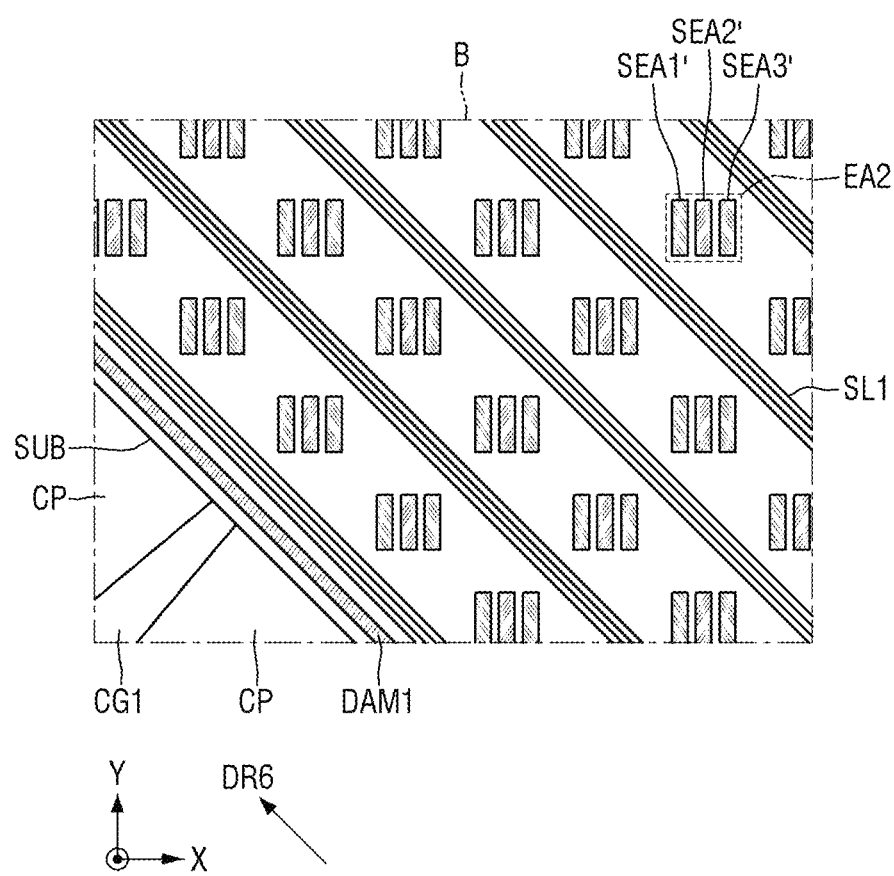
FIG. 12 is a layout view illustrating exemplary first sensor lines and exemplary second emission areas of the second display area of FIG. 6A.

FIG. 12 is a layout view illustrating exemplary first sensor lines and exemplary second emission areas of the second display area of FIG. 6A.

The exemplary embodiment of FIG. 12 differs from the exemplary embodiment of FIG. 9 in that multiple first sensor lines SL1 are disposed between each pair of adjacent second emission areas EA2 in the first direction (or the X-axis direction). For convenience of explanation, a further description of elements and technical aspects previously described may be omitted.

FIG. 12 illustrates that four first sensor lines SL1 are disposed between each pair of adjacent second emission areas EA2 in the first direction (or the X-axis direction). However, the present inventive concept is not limited thereto. For example, according to exemplary embodiments, the number of first sensor lines SL1 disposed between each pair of adjacent second emission areas EA2 in the first direction (or the X-axis direction) may be determined based on whether the first sensor lines SL1 are visible to the user due to the number and density of second emission areas EA2 in the second display area DA2. The maximum distance in the first direction (or the X-axis direction) between the first sensor lines SL1 may be about dozens of micrometers (um).

Figure 13:
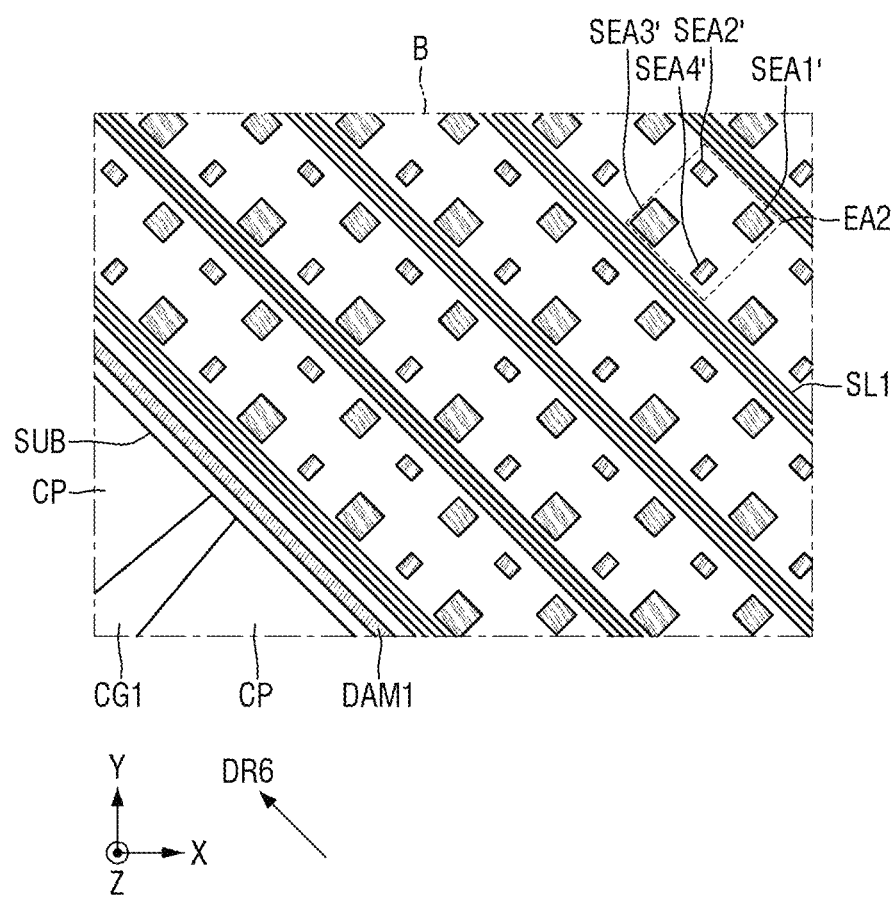
FIG. 13 is a layout view illustrating exemplary first sensor lines and exemplary second emission areas of the second display area of FIG. 6A.

FIG. 13 is a layout view illustrating exemplary first sensor lines and exemplary second emission areas of the second display area of FIG. 6A.

The exemplary embodiment of FIG. 13 differs from the exemplary embodiment of FIG. 12 only in that each of the second emission areas EA2 includes first, second, third, and fourth sub-emission areas SEA1', SEA2', SEA3', and SEA4', as illustrated in FIG. 7, instead of first, second, and third sub-emission areas SEA1', SEA2', and SEA3'. Thus, for convenience of explanation, a detailed description of the exemplary embodiment of FIG. 13 will be omitted.

Figure 14:
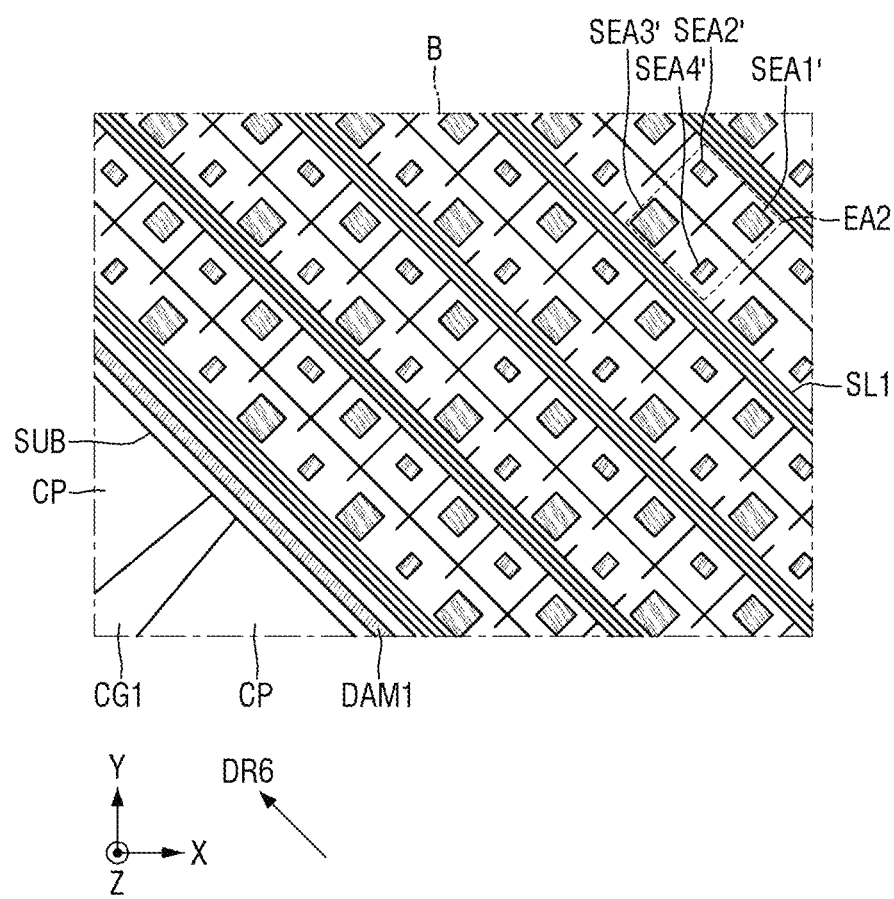
FIG. 14 is a layout view illustrating exemplary first sensor lines and exemplary second emission areas of the second display area of FIG. 6A.

FIG. 14 is a layout view illustrating exemplary first sensor lines and exemplary second emission areas of the second display area of FIG. 6A.

The exemplary embodiment of FIG. 14 differs from the exemplary embodiment of FIG. 13 only in that the first sensor lines SL1 are formed in a mesh form between the first sub-emission areas SEA1', the second sub-emission areas SEA2', the third sub-emission areas SEA3', and the fourth sub-emission areas SEA4'. Thus, for convenience of explanation, a detailed description of the exemplary embodiment of FIG. 14 will be omitted.

Figure 15:
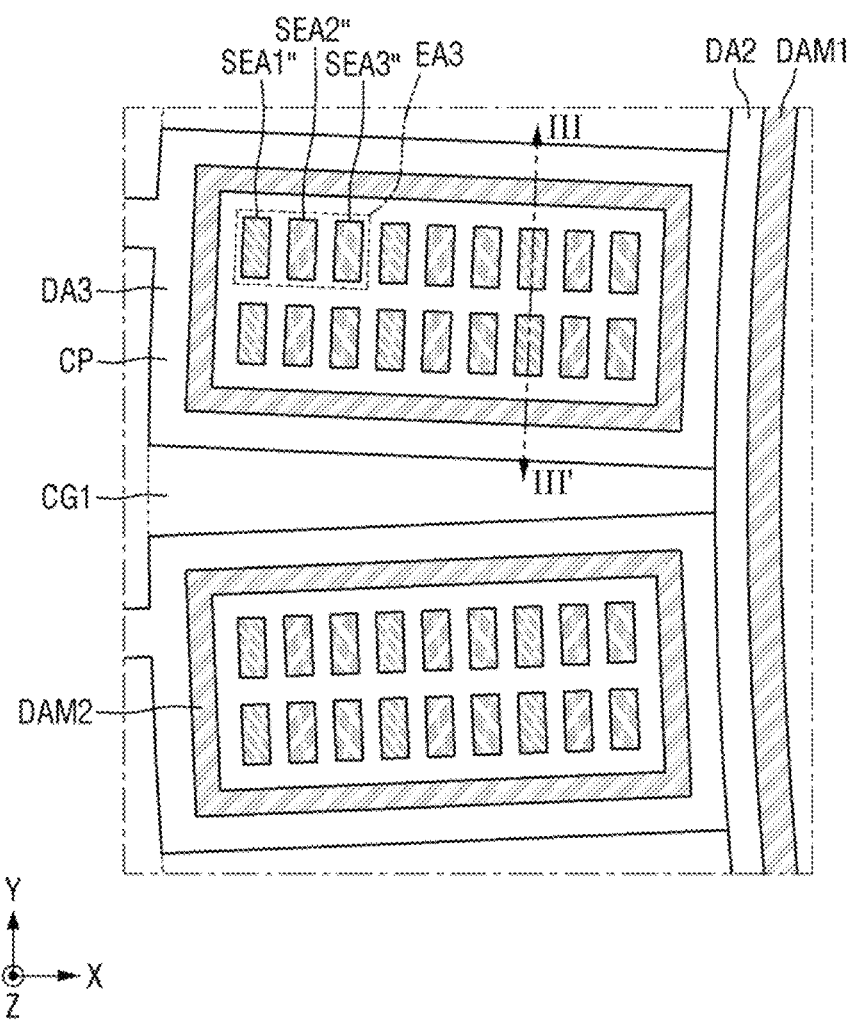
FIG. 15 is a layout view illustrating exemplary cutout portions and exemplary third emission areas of the third display area of FIG. 6A.

FIG. 15 is a layout view illustrating exemplary cutout portions and exemplary third emission areas of the third display area of FIG. 6A.

Referring to FIG. 15, the first ends of the cutout portions CP may be connected to the second display area DA2, and the second ends of the cutout portions CP may be connected to the second non-display area NDA2. The cutout portions CP may be formed in a substantially trapezoidal shape in a plan view. The width of the cutout portions CP may gradually increase or decrease from the second display area DA2 to the second non-display area NDA2. Alternatively, the cutout portions CP may be formed in various other shapes such as, for example, a rectangular shape, a rhombus shape, or a non-tetragonal polygonal shape.

The cutout portions CP may be formed by cutting the display panel 300 with light emitted by a laser. As a result, the first cutout gaps CG1 may be formed between the cutout portions CP. For example, a first cutout gap CG1 from among the plurality of first cutout gaps CG1 may be formed between adjacent cutout portions CP from among the plurality of cutout portions CP. Thus, the cutout portions CP may be spaced apart from one another with the first cutout gaps CG1 disposed therebetween. The maximum width of the cutout portions CP may be greater than the maximum width of the first cutout gaps CG1. In an exemplary embodiment, the first sensor lines SL1 are not disposed in the cutout portions CP.

Third emission areas EA3 and second dams DAM2 may be disposed in the cutout portions CP. Each of the third emission areas EA3 may include first, second, and third sub-emission areas SEA1", SEA2", and SEA3", which emit light of first, second, and third colors, respectively. For example, the first color may be red, the second color may be green, and the third color may be blue.

The first sub-emission areas SEA1", the second sub-emission areas SEA2", and the third sub-emission areas SEA3" may be arranged in the first direction (or the X-axis direction). The first sub-emission areas SEA1", the second sub-emission areas SEA2", and the third sub-emission areas SEA3" may have a rectangular shape in a plan view. For example, the first sub-emission areas SEA1", the second sub-emission areas SEA2", and the third sub-emission areas SEA3" may have a rectangular shape having short sides extending in the first direction (or the X-axis direction) and long sides (e.g., relatively longer than the short sides) extending in the second direction (or the Y-axis direction) in a plan view. However, the present inventive concept is not limited thereto. For example, according to exemplary embodiments, the first sub-emission areas SEA1", the second sub-emission areas SEA2", and the third sub-emission areas SEA3" may be formed in various other shapes such as, for example, a non-tetragonal polygonal shape, a circular shape, or an elliptical shape in a plan view. Although FIG. 15 illustrates that the first sub-emission areas SEA1", the second sub-emission areas SEA2", and the third sub-emission areas SEA3" have substantially the same area, the present inventive concept is not limited thereto. For example, according to exemplary embodiments, the first sub-emission areas SEA1", the second sub-emission areas SEA2", and the third sub-emission areas SEA'" may have different areas.

Figure 18:
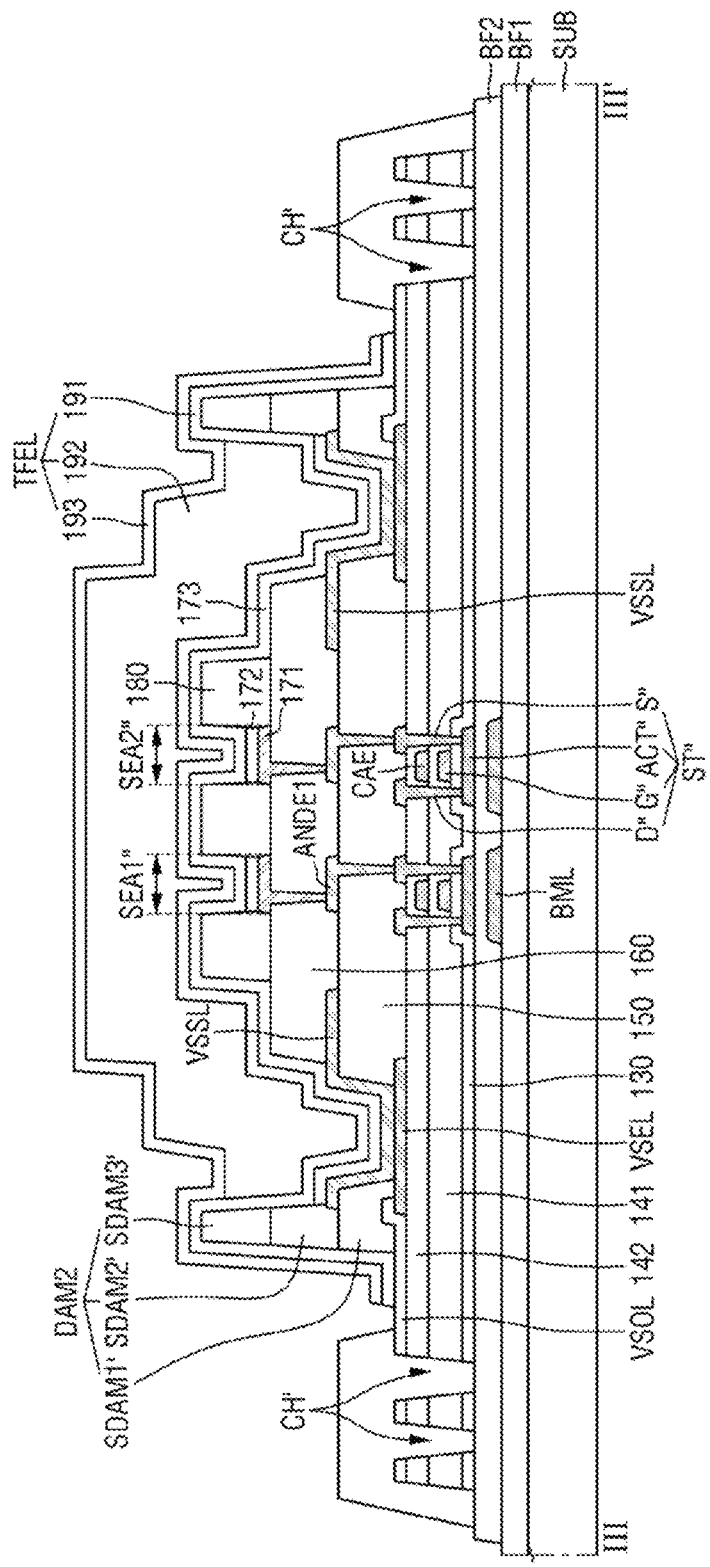
FIG. 18 is a cross-sectional view taken along line III-III' of FIG. 15 according to an exemplary embodiment of the present inventive concept.

The second dams DAM2 may be disposed along the edges of the third display area DA3. The second dams DAM2 may be a structure for preventing the spillover of an organic film from the encapsulation layer TFEL, as illustrated in FIG. 18. The second dams DAM2 may be disposed to surround the third emission areas EA3. For example, according to exemplary embodiments, the second dams DAM2 may entirely surround the third emission areas EA3.

Since the third emission areas EA3 are disposed in the cutout portions CP, as illustrated in FIG. 15, the third display area DA3 can display an image. That is, an image can be displayed even in the first corner portion CS1, to which strain is applied by double curvature. Similarly, according to exemplary embodiments, an image can be displayed even in the second corner portion CS2, the third corner portion CS3, and/or the fourth corner portion CS4.

Figure 16:
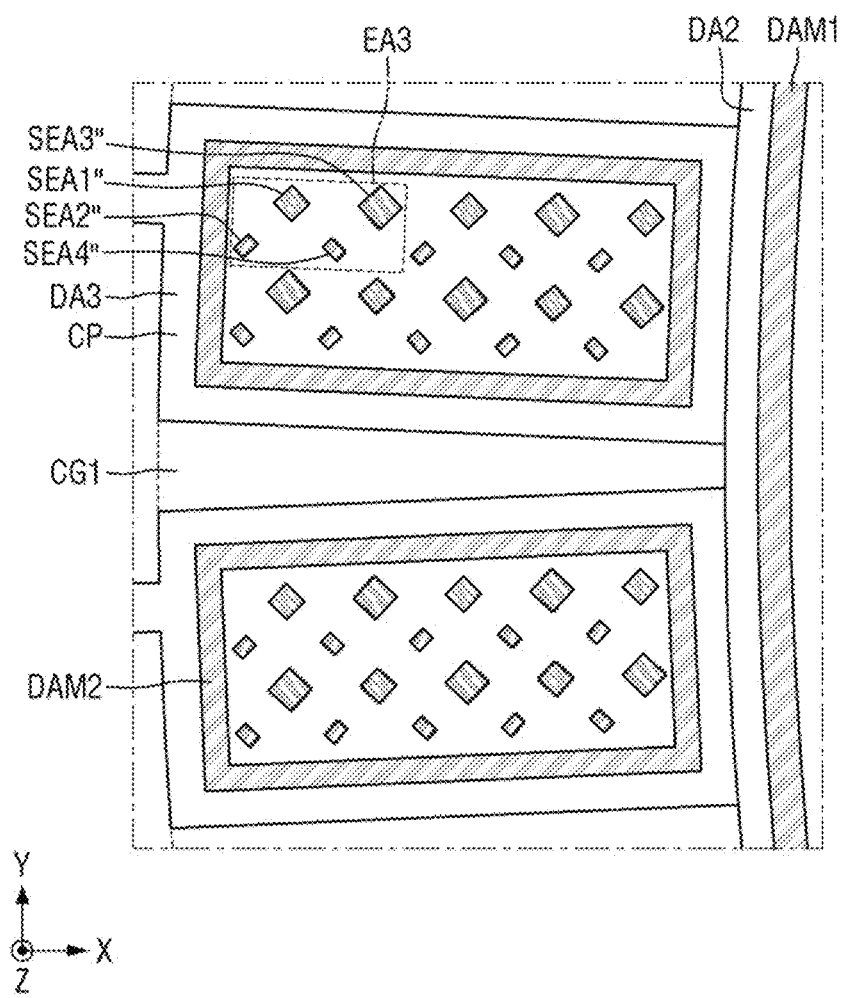
FIG. 16 is a layout view illustrating exemplary cutout portions and exemplary third emission areas of the third display area of FIG. 6A.

FIG. 16 is a layout view illustrating exemplary cutout portions and exemplary third emission areas of the third display area of FIG. 6A.

The exemplary embodiment of FIG. 16 differs from the exemplary embodiment of FIG. 15 in that each of the third emission areas EA3 includes first, second, third, and fourth sub-emission areas SEA1", SEA2", SEA3", and SEA4" instead of first, second, and third sub-emission areas SEA1", SEA2", and SEA3". The first, second, third, and fourth sub-emission areas SEA1", SEA2", SEA3", and SEA4" are substantially same as the first, second, third, and fourth sub-emission areas SEA1, SEA2, SEA3, and SEA4 described in FIG. 7, thus for convenience of explanation, a detailed description of the exemplary embodiment of FIG. 16 will be omitted.

FIG. 17 is a cross-sectional view taken along line II-II' of FIG. 9 according to an exemplary embodiment of the present inventive concept.

Referring to FIG. 17, a TFT ST' of the TFT layer TFTL, and first, second, and third sub-emission areas SEA1', SEA2', and SEA3' of the light-emitting element layer EML, may be substantially the same as their respective counterparts of FIG. 8. Thus, for convenience of explanation, a detailed description thereof will be omitted. The TFT ST' may include an active layer ACT', a gate electrode G', a drain electrode D', and a source electrode S', which are substantially the same as their respective counterparts of FIG. 8.

A first sensor line SL1 may be disposed to not overlap with the first, second, and third sub-emission areas SEA1', SEA2', and SEA3'. The first sensor line SL1 may be disposed on the third buffer film BF3. The first sensor line SL1 may be formed on the same layer, and of the same material, as the first connecting parts BE1 of FIG. 8.

A scan driving transistor SDT of a scan driving circuit may include a scan active layer SACT, a scan gate electrode SG, a scan source electrode SS, and a scan drain electrode SD. The scan active layer SACT, the scan gate electrode SG, the scan source electrode SS, and the scan drain electrode SD may be substantially the same as the active layers ACT, the gate electrodes G, the source electrodes S, and the drain electrodes D, respectively, of the TFT layer TFTL of FIG. 8. Thus, for convenience of explanation, a detailed description thereof will be omitted.

The scan driving transistor SDT is disposed in the TFT layer TFTL together with the TFT ST', which is for driving the first, second, and third sub-emission areas SEA1', SEA2', and SEA3' of a second emission area EA2. Thus, the scan driving transistor SDT may be disposed in an area where the TFT ST' is not disposed to avoid the TFT ST'. In this case, since the first sensor line SL1 is disposed to not overlap the first, second, and third sub-emission areas SEA1', SEA2', and SEA3', the scan driving transistor SDT may overlap the first sensor line SL1 in the third direction (or the Z-axis direction).

A first power supply connecting line VSEL may be disposed on the second interlayer insulating film 142. The first power supply connecting line VSEL may be formed of the same material as source and drain electrodes S' and D' of the TFT ST' and the source and drain electrodes SS and SD of the scan driving transistor SDT.

A first power supply line VSSL may be disposed on the first organic film 150. The first power supply line VSSL may be formed of the same material as a first connecting electrode ANDE1. The first power supply line VSSL may be connected to the first power supply connecting line VSEL via a contact hole that penetrates the first organic film 150. A first power supply voltage may be applied to the first power supply line VSSL.

A second light-emitting electrode 173 may be connected to the first power supply line VSSL via a contact hole that penetrates the second organic film 160. The first power supply voltage from the first power supply line VSSL may be applied to the second light-emitting electrode 173.

The encapsulation layer TFEL may include at least one inorganic film that prevents the penetration of oxygen or moisture into the light-emitting element layer EML. Also, the encapsulation layer TFEL may include at least one organic film that protects the light-emitting element layer EML from a foreign material such as dust. For example, the encapsulation layer TFEL may include a first inorganic film 191 which is disposed on the second light-emitting electrode 173, an organic film 192 which is disposed on the first inorganic film 191, and a second inorganic film 193 which is disposed on the organic film 192.

A first dam DAM1 may be disposed in the second display area DA2 to prevent the spillover of the organic film 192 of the encapsulation layer TFEL. The first dam DAM1 may include a first sub-dam SDAM1 which is formed of the same material as the first organic film 150, a second sub-dam SDAM2 which is formed of the same material as the second organic film 160, and a third sub-dam SDAM3 which is formed of the same material as the bank 180. Due to the presence of the first dam DAM1, the end of the organic film 192 may be disposed between the first sub-emission area SEA1', which is the outermost sub-emission area, and the first dam DAM1. The first and second inorganic films 191 and 193 may be disposed on the first dam DAM1. The first and second inorganic films 191 and 193 may be in contact with each other over the first dam DAM1.

An additional dam may be further disposed on the outside of the first dam DAM1 to contain the organic film 192 that may have spilt out of the first dam DAM1. In this case, the additional dam may have substantially the same structure as the first dam DAM1.

The first power supply connecting line VSEL may be connected to a first power supply outer line VSOL, and the first power supply outer line VSOL may extend to the edge of the second display area DA2. Crack prevention holes CH, which penetrate the first power supply outer line VSOL, the first and second interlayer insulating films 141 and 142, and the gate insulating film 130, may be formed on the edge of the second display area DA2 to prevent the propagation of cracks. The first organic film 150 may be formed to cover the crack prevention holes CH. In an exemplary embodiment, the crack prevention holes CH may be omitted.

As illustrated in FIG. 17, the scan driving transistor SDT of the scan driving circuit may be disposed in the area where the TFT ST', which is for driving the first, second, and third sub-emission areas SEA1', SEA2', and SEA3' of the second emission area EA2, is not disposed to avoid the TFT ST'. In this case, since the first sensor line SL1 is disposed to not overlap the first, second, and third sub-emission areas SEA1', SEA2', and SEA3', the scan driving transistor SDT can overlap the first sensor line SL1 in the third direction (or the Z-axis direction).

FIG. 18 is a cross-sectional view taken along line III-III' of FIG. 15.

Referring to FIG. 18, a TFT ST" of the TFT layer TFTL, and first, second, and third sub-emission areas SEA1", SEA2", and SEA3" of the light-emitting element layer EML, may be substantially the same as their respective counterparts of FIG. 8. Thus, for convenience of explanation, a detailed description thereof will be omitted. The TFT ST" may include an active layer ACT", a gate electrode G", a drain electrode D", and a source electrode S", which are substantially the same as their respective counterparts of FIG. 8.

A first power supply connecting line VSEL, a first power supply line VSSL, a first power supply outer line VSOL, and crack prevention holes CH' are substantially the same as their respective counterparts of FIG. 17. Thus, for convenience of explanation, a detailed description thereof will be omitted.

In the third display area DA3, a second dam DAM2 may be disposed to prevent the spillover of the organic film 192 of the encapsulation layer TFEL. The second dam DAM2 may include a first sub-dam SDAM1' which is formed of the same material as the first organic film 150, a second sub-dam SDAM2' which is formed of the same material as the second organic film 160, and a third sub-dam SDAM3' which is formed of the same material as the bank 180. Due to the presence of the second dam DAM2, the end of the organic film 192 may be disposed between the first sub-emission area SEA1", which is the outermost sub-emission area, and the second dam DAM2. The first and second inorganic films 191 and 193 may be disposed on the second dam DAM2. The first and second inorganic films 191 and 193 may be in contact with each other over the second dam DAM2.

An additional dam may be further disposed on the outside of the second dam DAM2 to contain the organic film 192 that may have spilt out of the second dam DAM2. In this case, the additional dam may have substantially the same structure as the second dam DAM2.

As illustrated in FIG. 18, the first, second, and third sub-emission areas SEA1", SEA2", and SEA3" of the third emission area EA3 are surrounded by the second dam DAM2. Thus, the first inorganic film 191, the organic film 192, and the second inorganic film 193 of the encapsulation layer TFEL can stably seal the third emission area EA3.

Figure 19:
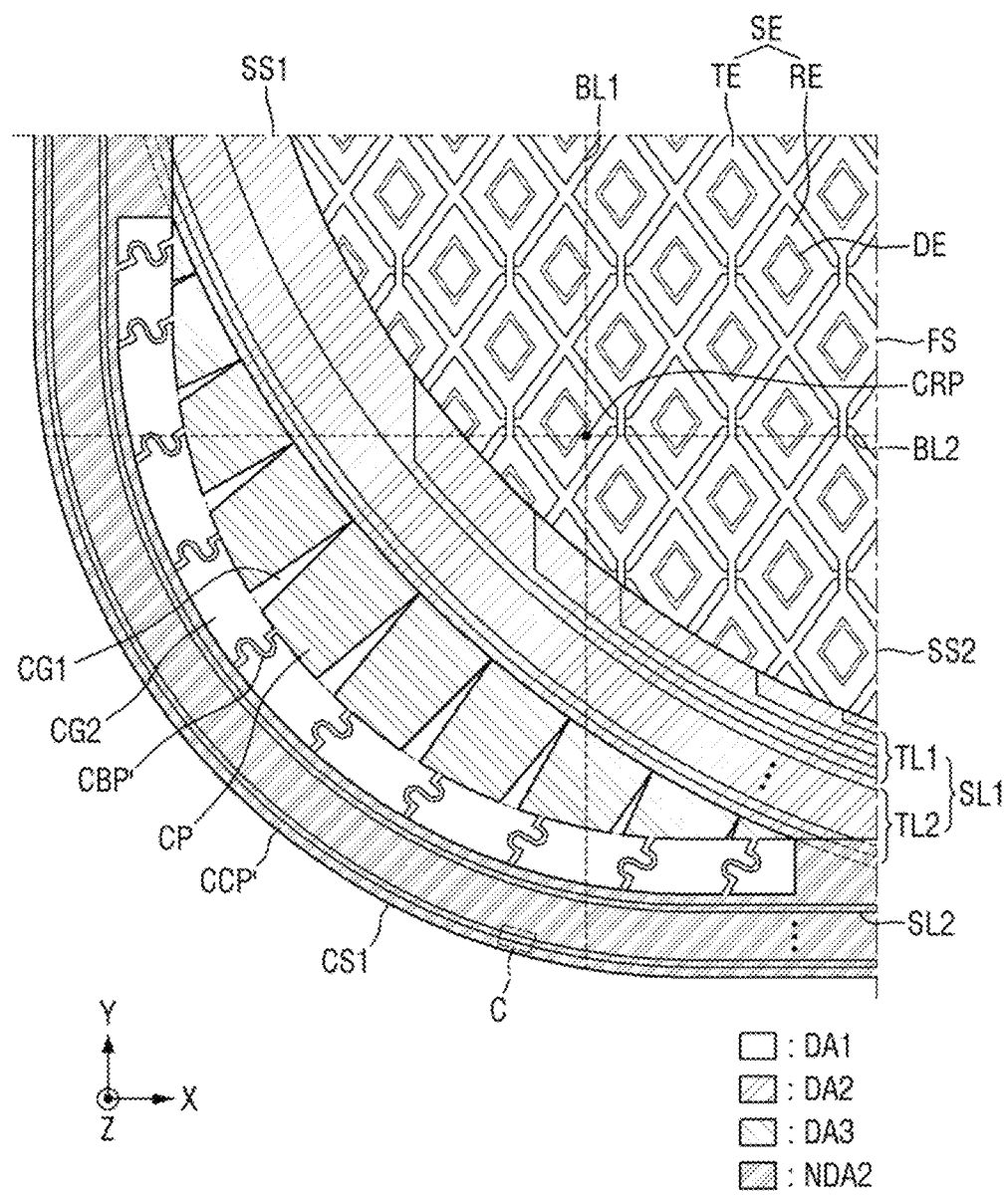
FIG. 19 is a layout view illustrating first, second, and third display areas and a second non-display area of a display panel according to an exemplary embodiment of the present inventive concept.

FIG. 19 is a layout view illustrating first, second, and third display areas and a second non-display area of a display panel according to an exemplary embodiment of the present inventive concept.

The exemplary embodiment of FIG. 19 differs from the exemplary embodiment of FIG. 6A in that second sensor lines SL2 are disposed in a cutout common pattern CCP' of a substrate SUB. For convenience of explanation, a further description of elements and technical aspects previously described may be omitted.

Referring to FIG. 19, the length of cutout connecting portions CBP', which are connected to cutout portions CP, may be smaller than the length of the cutout connecting portions CBP of FIG. 6A. As a result, the width of the cutout common pattern CCP' of FIG. 19 may be greater than the width of the cutout common pattern CCP of FIG. 6A.

The second sensor lines SL2 may be disposed in the cutout common pattern CCP' of the second non-display area NDA2, and may be defined as being sensor lines connected to some sensor electrodes SE of the first display area DA1. For example, the second sensor lines SL2 may include second driving lines TL2 connected to driving electrodes TE disposed in the upper part of the first display area DA1.

Figure 20:
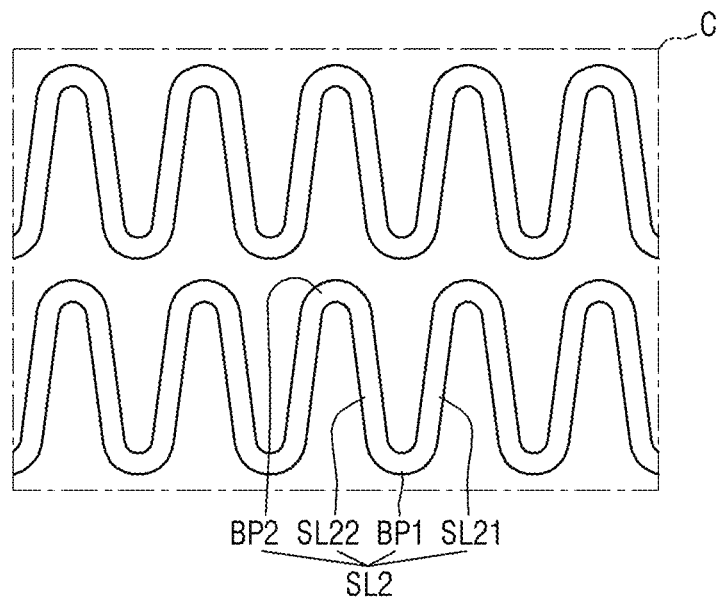
FIG. 20 is a layout view illustrating exemplary second sensor lines of the second display area of FIG. 19.
Figure 21:
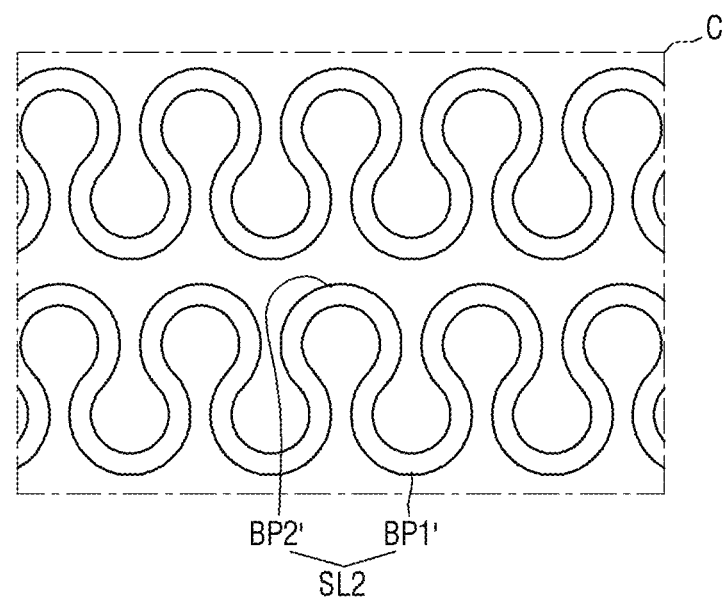
FIG. 21 is a layout view illustrating exemplary second sensor lines of the second display area of FIG. 19.

The second sensor lines SL2 may be formed in a winding shape, as illustrated in FIGS. 20 and 21, to reduce strain applied by double curvature in the first corner portion CS1. FIGS. 20 and 21 are enlarged layout views of an area C of FIG. 19. That is, FIGS. 20 and 21 illustrate enlarged views of the second sensor lines SL2.

In an exemplary embodiment, as illustrated in FIG. 20, the second sensor lines SL2 may be formed in a wavy shape. In this example, each of the second sensor lines SL2 may include a first sub-sensor line SL21 which extends substantially straight, a first bent portion BP1 which extends from the first sub-sensor line SL21 and is bent to have a predetermined curvature, a second sub-sensor line SL22 which extends substantially straight from the first bent portion BP1, and a second bent portion BP2 which is bent to have a predetermined curvature. In each of the second sensor lines SL2, groups of the first sub-sensor line SL21, the first bent portion BP1, the second sub-sensor line SL22, and the second bent portion BP2 may be repeatedly arranged. The first and second bent portions BP1 and BP2 may have substantially the same curvature or may have different curvatures.

In an exemplary embodiment, as illustrated in FIG. 21, the second sensor lines SL2 may be formed in a winding shape. In this example, each of the second sensor lines SL2 may include a first bent portion BP1' which has a fifth curvature, and a second bent portion BP2' which has a sixth curvature. In each of the second sensor lines SL2, groups of the first and second bent portions BP1' and BP2' may be repeatedly arranged. The fifth curvature of the first bent portion BP1' and the sixth curvature of the second bent portion BP2' may be substantially the same or may be different.

In an exemplary embodiment, the second non-display area NDA2 does not include the cutout connecting portions CBP', second cutout gaps CG2, and the cutout common pattern CCP'. In this case, the second sensor lines SL2 may be disposed anywhere in the second non-display area NDA2.

As illustrated in FIG. 19, as the width of the cutout common pattern CCP' increases, second sensor lines SL2 corresponding to some of the first sensor lines SL1 in the second display area DA2 may be disposed in the second non-display area NDA2. That is, some of the first sensor lines SL1 in the second display area DA2 may be moved to the second non-display area NDA2. Thus, since the number of first sensor lines SL1 in the second display area DA2 can be reduced, enough space for the arrangement of the second emission areas EA2 can be secured in the second display area DA2, and the resolution of the second display area DA2 can be improved.

Part of the second display area DA2, part of the third display area DA3, and part of the second non-display area NDA2 in the second to fourth corner portion CS2 to CS4 may be similar to their respective counterparts of FIG. 19. However, the part of the second non-display area NDA in the second corner portion CS2 differs from its counterpart of FIG. 19 in that the second sensor lines SL2 include sensing lines RL connected to sensing electrodes RE in the first display area DA1, instead of second driving lines TL2. Also, the part of the second non-display area NDA2 in the third corner portion CS3 differs from its counterpart of FIG. 19 in that it does not include second sensor lines SL2. The part of the second non-display area NDA2 in a fourth corner portion CS4 may be substantially the same as its counterpart of FIG. 19.

Figure 22:
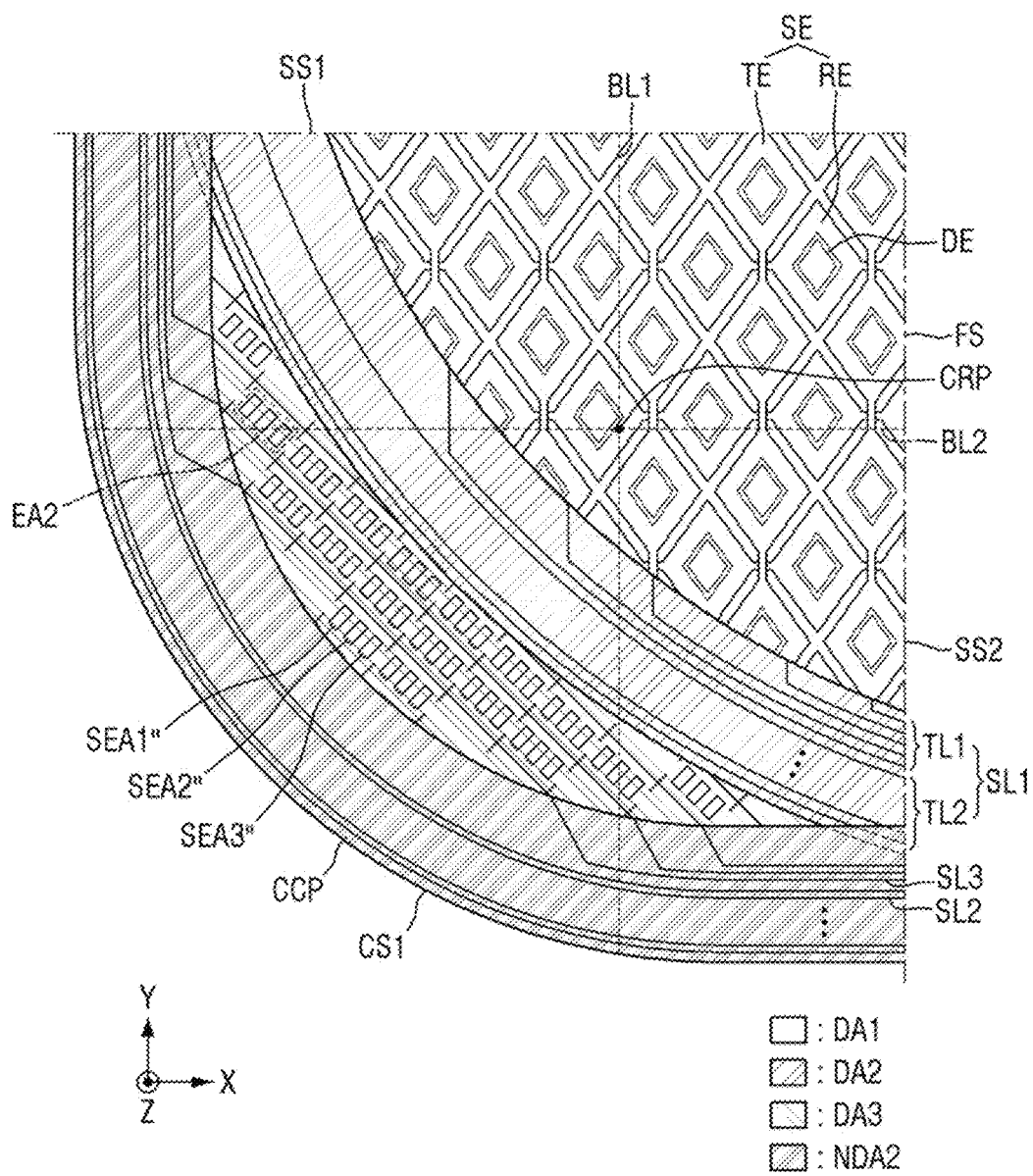
FIG. 22 is a layout view illustrating first, second, and third display areas and a second non-display area of a display panel according to an exemplary embodiment of the present inventive concept.

FIG. 22 is a layout view illustrating first, second, and third display areas and a second non-display area of a display panel according to an exemplary embodiment of the present inventive concept.

The exemplary embodiment of FIG. 22 differs from the exemplary embodiment of FIG. 19 in that third sensor lines SL3 are disposed in the third display area DA3. For convenience of explanation, a further description of elements and technical aspects previously described may be omitted.

Figure 23:
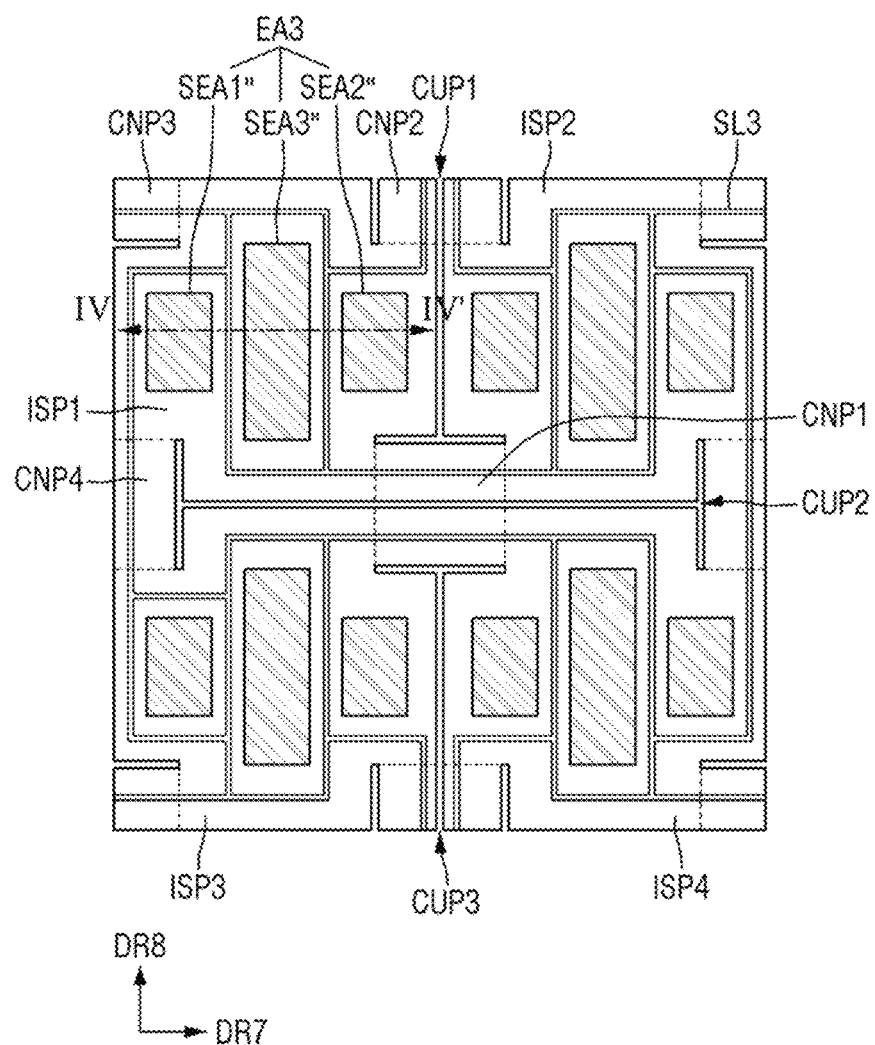
FIGS. 23 and 24 are layout views illustrating exemplary island portions, exemplary connecting portions, exemplary third sensor lines, and exemplary third emission areas of the third display area of FIG. 22.

Referring to FIG. 22, the third display area DA3 may include third emission areas EA3 and third sensor lines SL3, which are disposed in island portions (ISP1, ISP2, ISP3, and ISP4 of FIGS. 23 and 24).

Since the island portions (ISP1, ISP2, ISP3, and ISP4) are formed by laser cutting, the island portions (ISP1, ISP2, ISP3, and ISP4) may be spaced apart from one another. The island portions (ISP1, ISP2, ISP3, and ISP4) may be connected via connecting portions (CNP1, CNP2, CNP3, and CNP4 of FIGS. 23 and 24). The island portions (ISP1, ISP2, ISP3, and ISP4) will be described in further detail below with reference to FIGS. 23 and 24.

The third sensor lines SL3 may be disposed in the third display area DA3 and may be defined as being sensor lines connected to some sensor electrodes SE in the first display area DA1. For example, the third sensor lines SL3 may include second driving lines TL2 connected to driving electrodes TE disposed in the upper part of the first display area DA1.

The third sensor lines SL3 may be arranged in a mesh form, as illustrated in FIG. 22. The third sensor lines SL3 may be disposed between the third emission areas EA3.

As illustrated in FIG. 22, the island portions (ISP1, ISP2, ISP3, and ISP4) may be formed in the third display area DA3 and may be connected via the connecting portions (CNP1, CNP2, CNP3, and CNP4), thereby arranging third sensor lines SL3 corresponding to some of first sensor lines SL1 in the second display area DA2. That is, some of the first sensor lines SL1 in the second display area DA2 may be moved to the third display area DA3. Thus, since the number of first sensor lines SL1 in the second display area DA2 can be reduced, enough space for the arrangement of the second emission areas EA2 can be secured in the second display area DA2, and the resolution of the second display area DA2 can be improved.

FIGS. 23 and 24 are layout views illustrating exemplary island portions, exemplary connecting portions, exemplary third sensor lines, and exemplary third emission areas of the third display area of FIG. 22.

Referring to FIGS. 23 and 24, the third display area DA3 may further include first, second, third, and fourth island portions ISP1, ISP2, ISP3, and ISP4 and first, second, third, and fourth connecting portions CNP1, CNP2, CNP3, and CNP4.

The first, second, third, and fourth island portions ISP1, ISP2, ISP3, and ISP4 may be spaced apart from one another. For example, a first cutout portion CUP1 may be disposed between the first and second island portions ISP1 and ISP2, and as a result, the first island portion ISP1 may be spaced apart from the second island portion ISP2 in a seventh direction DR7. For example, a second cutout portion CUP2 may be disposed between the first and third island portions ISP1 and ISP3, and as a result, the first island portion ISP1 may be spaced apart from the third island portion ISP3 in an eighth direction DR8. For example, the second cutout portion CUP2 may be disposed between the second and fourth island portions ISP2 and ISP4, and as a result, the fourth island portion ISP4 may be spaced apart from the second island portion ISP2 in the eighth direction DR8. For example, a third cutout portion CUP3 may be disposed between the third and fourth island portions ISP3 and ISP4, and as a result, the fourth island portion ISP4 may be spaced apart from the third island portion ISP3 in the seventh direction DR7.

The first, second, third, and fourth connecting portions CNP1, CNP2, CNP3, and CNP4 may extend from the first, second, third, and fourth island portions ISP1, ISP2, ISP3, and ISP4, respectively.

The first connecting portion CNP1 may extend from the first island portion ISP1 along the seventh direction DR7. The first connecting portion CNP1 may connect the first and second island portions ISP1 and ISP2.

The second connecting portion CNP2 may extend from the first island portion ISP1 along the eighth direction DR8. The second connecting portion CNP2 may be connected to an island portion disposed on the upper side of the first island portion ISP1.

The third connecting portion CNP3 may extend from the first island portion ISP1 along the seventh direction DR7. The third connecting portion CNP3 may be connected to an island portion disposed on the left side of the first island portion ISP1.

The fourth connecting portion CNP4 may extend from the first island portion ISP1 along the eighth direction DR8. The fourth connecting portion CNP4 may be connected to the third island portion ISP3.

Third emission areas EA3 may be disposed in the first, second, third, and fourth island portions ISP1, ISP2, ISP3, and ISP4. Each of the third emission areas EA3 may include first, second, and third sub-emission areas SEA1", SEA2", and SEA3", which emit light of first, second, and third colors, respectively. For example, the first color may be red, the second color may be green, and the third color may be blue.

The first, second, and third sub-emission areas SEA1", SEA2", and SEA3" may be arranged in the seventh direction DR7. The third sub-emission area SEA3" may be disposed between the first and second sub-emission areas SEA1" and SEA2" in the seventh direction DR7. The first, second, and third sub-emission areas SEA1", SEA2", and SEA3" may have a rectangular shape in a plan view. For example, the first, second, and third sub-emission areas SEA1", SEA2", and SEA3" may have a rectangular shape having short sides in the seventh direction DR7 and long sides (e.g., relatively longer than the short sides) in the eighth direction DR8 in a plan view. However, the present inventive concept is not limited thereto. For example, according to exemplary embodiments, the first, second, and third sub-emission areas SEA1", SEA2", and SEA3" may be formed in various other shapes such as, for example, a non-tetragonal polygonal shape, a circular shape, or an elliptical shape in a plan view. Although FIGS. 23 and 24 illustrate that the third sub-emission area SEA3" is larger in size than the first and second sub-emission areas SEA1" and SEA2", the present inventive concept is not limited thereto.

Third sensor lines SL3 may be disposed in the first, second, third, and fourth island portions ISP1, ISP2, ISP3, and ISP4 and the first, second, third, and fourth connecting portions CNP1, CNP2, CNP3, and CNP4. In an exemplary embodiment, the third sensor lines SL3 do not overlap the first, second, and third sub-emission areas SEA1", SEA2", and SEA3". That is, in an exemplary embodiment, the third sensor lines SL3 do not overlap the third emission areas EA3. The third sensor lines SL3 may be disposed between the first and third sub-emission areas SEA1" and SEA3" and between the second and third sub-emission areas SEA2" and SEA3". The third sensor lines SL3 may be formed in an amorphous mesh form.

Since the third display area DA3 is disposed in a first corner portion CS1, the first, second, third, and fourth island portions ISP1, ISP2, ISP3, and ISP4 may become spaced apart from one another, as illustrated in FIG. 24, due to strain caused by double curvature.

Since the third emission areas EA3 are disposed in the first, second, third, and fourth island portions ISP1, ISP2, ISP3, and ISP4, as illustrated in FIGS. 23 and 24, the third display area DA3 can display an image. That is, an image can be displayed even in the first corner portion CS1, to which strain is applied by double curvature.

Also, since the island portions (ISP1, ISP2, ISP3, and ISP4) are connected to one another via the connecting portions (CNP1, CNP2, CNP3, and CNP4) and the third sensor lines SL3 are disposed in the connecting portions (CNP1, CNP2, CNP3, and CNP4), some of the first sensor lines SL1 in the second display area DA2 may be moved to the third display area DA3. Thus, since the number of first sensor lines SL1 in the second display area DA2 can be reduced, enough space for the arrangement of the second emission areas EA2 can be secured in the second display area DA2, and the resolution of the second display area DA2 can be improved.

Figure 25:
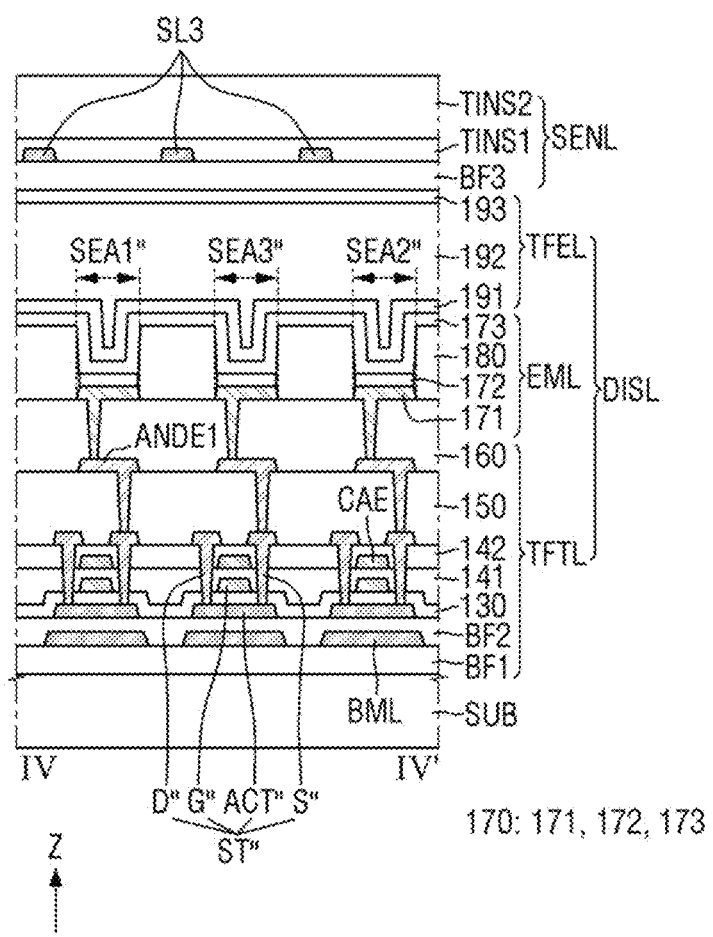
FIG. 25 is a cross-sectional view taken along line IV-IV' of FIG. 23 according to an exemplary embodiment of the present inventive concept.

FIG. 25 is a cross-sectional view taken along line IV-IV' of FIG. 23 according to an exemplary embodiment of the present inventive concept.

Referring to FIG. 25, a TFT ST" of a TFT layer TFTL, and first, second, and third sub-emission areas SEA1", SEA2", and SEA3" of a light-emitting element layer EML, may be substantially the same as their respective counterparts of FIG. 18. Thus, for convenience of explanation, a detailed description thereof will be omitted.

Third sensor lines SL3 may be disposed to not overlap the first, second, and third sub-emission areas SEA1", SEA2", and SEA3". The third sensor lines SL3 may be disposed on a third buffer film BF3. The third sensor lines SL3 may be formed on the same layer, and of the same material, as the first connecting parts BE1 of FIG. 8.

In a display device according to an exemplary embodiment of the present inventive concept, a third display area that can display an image is disposed in the corner portions of a display device, and a second display area including emission areas is additionally disposed between a first display area in the front portion of the display device and the third display area. Accordingly, when an image is displayed in the first and third display areas, a non-display area between the first and third display areas can be prevented from becoming visible to a user.

In a display device according to an exemplary embodiment of the present inventive concept, since sensor lines are disposed in a non-display area on the outside of the third display area, the number of sensor lines disposed in the second display area between the first and third display areas can be reduced. As a result, enough space for the arrangement of second emission areas can be secured in the second display area, and the resolution of the second display area can be improved.

In a display device according to an exemplary embodiment of the present inventive concept, since sensor lines are disposed in the third display area, the number of sensor lines disposed in the second display area between the first and third display areas can be reduced. As a result, enough space for the arrangement of second emission areas can be secured in the second display area, and the resolution of the second display area can be improved.

While the present inventive concept has been particularly shown and described with reference to the exemplary embodiments thereof, it will be understood by those of ordinary skill in the art that various changes in form and detail may be made thereto without departing from the spirit and scope of the present inventive concept as set forth in the following claims.

What is claimed is:

1. A display device, comprising:
a display panel including a front portion, a first side portion which extends from a first side of the front portion, a second side portion which extends from a second side of the front portion, and a corner portion disposed between the first side portion and the second side portion, and wherein the display panel further includes:
a first display area disposed in the front portion and including a plurality of first light-emitting elements; and
a second display area disposed in the corner portion, and wherein the second display area includes:
a plurality of second light-emitting elements;
a plurality of thin film transistors, each of the plurality of thin film transistors is connected to corresponding one of the plurality of second light-emitting elements; and
a plurality of scan driving transistors of a scan driving circuit for outputting scan signals, and
wherein at least one thin film transistor among the plurality of thin film transistors is disposed between adjacent scan driving transistors among the plurality of scan driving transistors in one direction,
wherein the second display area further includes a first power supply line to which a first power supply voltage is applied, and
wherein the first power supply line overlaps at least one scan driving transistor of the plurality of scan driving transistors.

2. The display device of claim 1, wherein the second display area further includes a dam outside the plurality of scan driving transistors.

3. The display device of claim 2, wherein the display panel further includes a third display area disposed in the corner portion and including a plurality of third light-emitting elements, and
wherein first dam is disposed closer to the third display area than the first display area.

4. The display device of claim 2, wherein the second display area further includes a crack prevention hole outside the dam.

5. The display device of claim 1, wherein the first power supply line is electrically connected to a common electrode of the plurality of second light-emitting elements.

6. The display device of claim 1, wherein a thin film transistor among the plurality of thin film transistors overlaps a second light-emitting element among the plurality of second light-emitting elements.

* * * * *